United States Patent
Chen

(10) Patent No.: US 10,742,633 B2
(45) Date of Patent: Aug. 11, 2020

(54) METHOD AND SYSTEM FOR SECURING DATA

(71) Applicant: Xiaoqing Chen, Westborough, MA (US)

(72) Inventor: Xiaoqing Chen, Westborough, MA (US)

( * ) Notice: Subject to any disclaimer, the term of this patent is extended or adjusted under 35 U.S.C. 154(b) by 2 days.

(21) Appl. No.: 16/252,559

(22) Filed: Jan. 18, 2019

(65) Prior Publication Data

US 2019/0158488 A1 May 23, 2019

Related U.S. Application Data

(63) Continuation of application No. 15/017,629, filed on Feb. 6, 2016, now abandoned.

(51) Int. Cl.
*H04L 29/06* (2006.01)
*G06F 21/62* (2013.01)
*G06F 21/60* (2013.01)

(52) U.S. Cl.
CPC .......... *H04L 63/0807* (2013.01); *G06F 21/60* (2013.01); *G06F 21/6218* (2013.01); *H04L 63/0428* (2013.01); *H04L 63/0435* (2013.01); *H04L 63/0442* (2013.01); *H04L 63/061* (2013.01); *H04L 63/10* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 8,560,785 B1* | 10/2013 | Malhotra | ............ | G06F 21/6218 711/162 |
| 9,152,578 B1* | 10/2015 | Saad | ................... | G06F 12/1408 |
| 9,209,974 B1* | 12/2015 | Akinyele | .................. | H04L 9/30 |
| 9,397,984 B1* | 7/2016 | Hu | ......................... | H04L 63/061 |
| 2005/0060741 A1* | 3/2005 | Tsutsui | ................... | H04N 5/445 725/32 |
| 2006/0010323 A1* | 1/2006 | Martin | ...................... | H04L 9/30 713/171 |
| 2008/0208755 A1* | 8/2008 | Malcolm | ................. | G06F 21/10 705/59 |
| 2008/0263363 A1* | 10/2008 | Jueneman | ............... | G06F 21/32 713/184 |
| 2010/0199042 A1* | 8/2010 | Bates | ...................... | H04L 9/321 711/114 |
| 2013/0054968 A1* | 2/2013 | Gupta | ................. | H04L 63/0428 713/168 |
| 2013/0275656 A1* | 10/2013 | Talagala | ................ | G06F 3/0679 711/103 |
| 2014/0049653 A1* | 2/2014 | Leonard | ................ | G06T 1/0042 348/207.1 |

(Continued)

*Primary Examiner* — Kenny S Lin

(57) ABSTRACT

A method and system for securing user data, or data, possessed by a data owner, are disclosed. In one aspect data is concealed and encrypted to ensure data confidentiality, and may also be signed to ensure data integrity and authenticity. In another aspect accesses to data are controlled by the data owner through a distributed access control system. In another aspect the public keys of users are distributed automatically in a distributed manner, and are controlled by the users owning the corresponding public and private key pairs.

17 Claims, 22 Drawing Sheets

Encrypting Data Access Object

(56) References Cited

U.S. PATENT DOCUMENTS

| | | | |
|---|---|---|---|
| 2014/0281482 A1* | 9/2014 | Diamond | H04L 63/168 |
| | | | 713/151 |
| 2015/0161362 A1* | 6/2015 | Clift | H04L 63/0428 |
| | | | 713/171 |
| 2016/0014095 A1* | 1/2016 | Strayer | H04L 67/20 |
| | | | 713/168 |
| 2016/0140131 A1* | 5/2016 | Chen | G06F 16/113 |
| | | | 707/667 |
| 2016/0291891 A1* | 10/2016 | Cheriton | G06F 3/0673 |
| 2017/0052973 A1* | 2/2017 | Wang | G06F 16/1727 |
| 2017/0061138 A1* | 3/2017 | Lambert | H04L 63/18 |
| 2017/0111172 A1* | 4/2017 | Sprenger | H04L 63/06 |
| 2017/0187696 A1* | 6/2017 | Ahuja | H04L 63/06 |

* cited by examiner

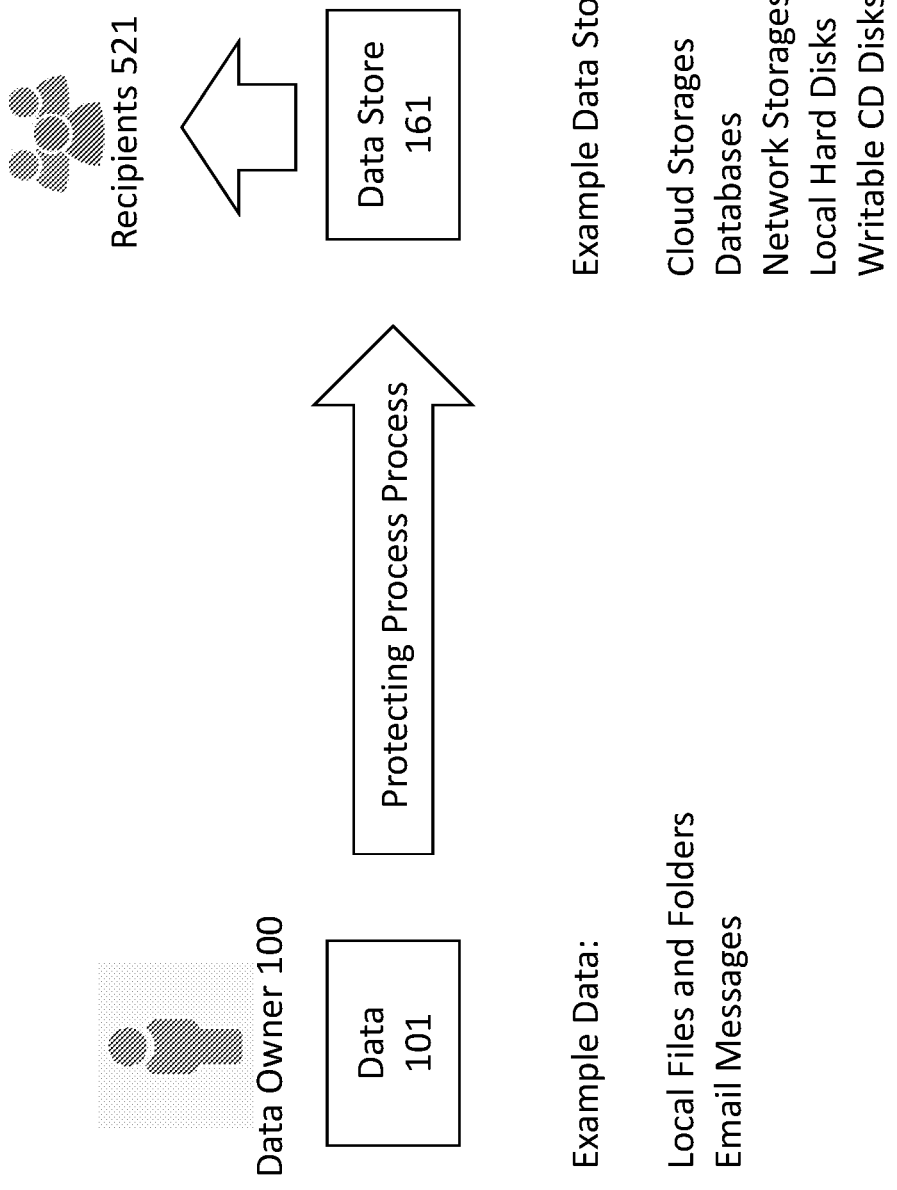

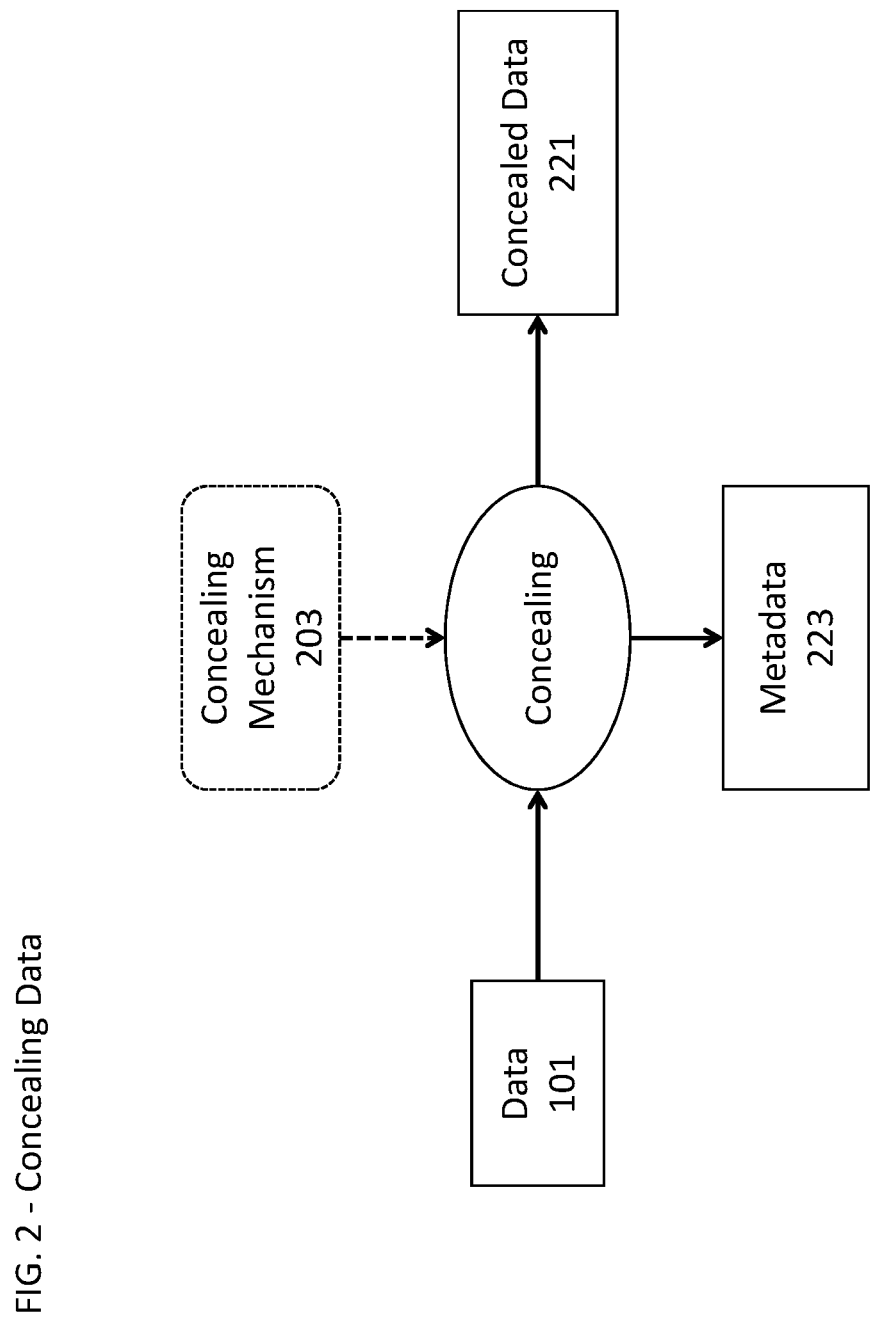
FIG. 2 - Concealing Data

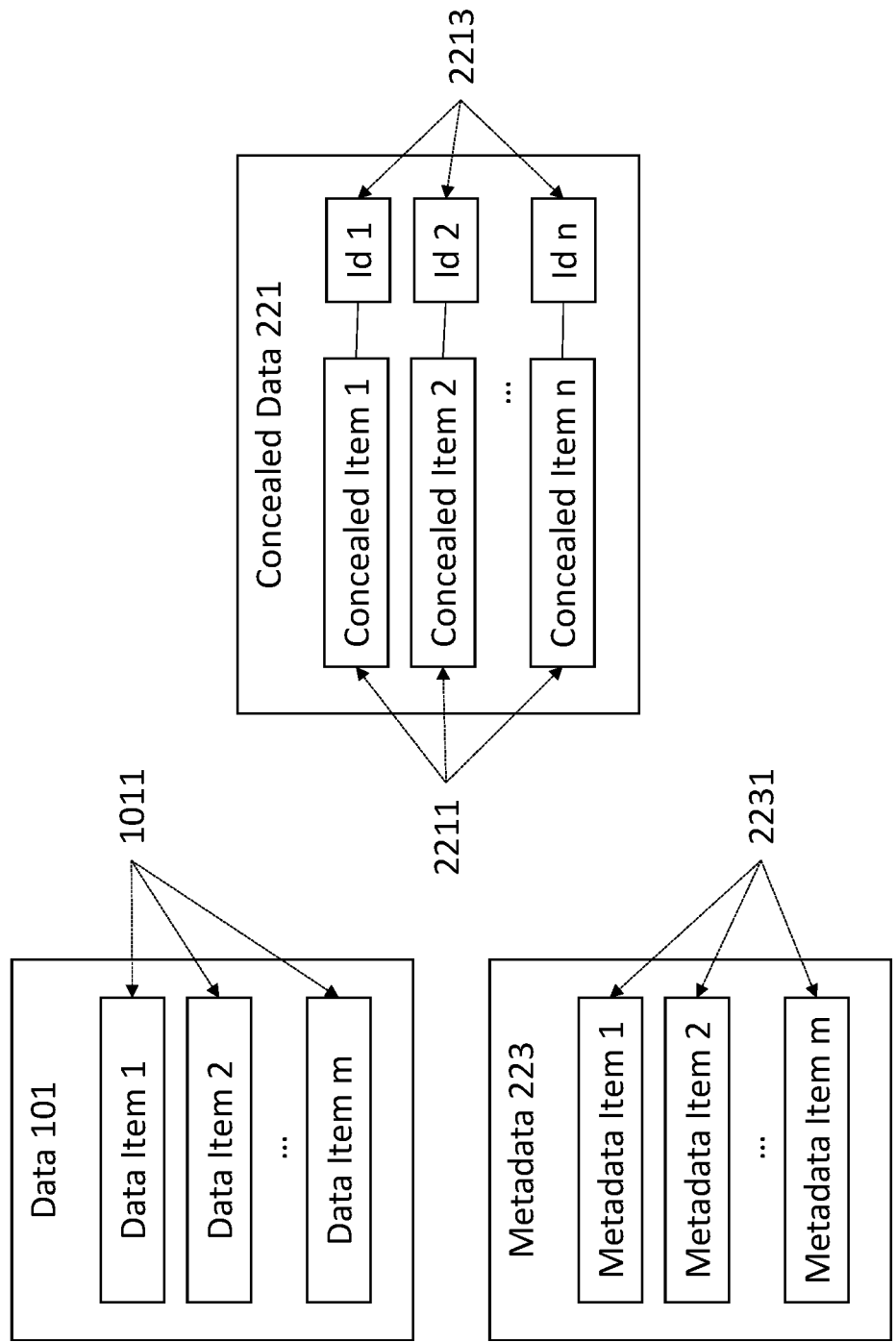
FIG. 2A – Data, Metadata and Concealed Data

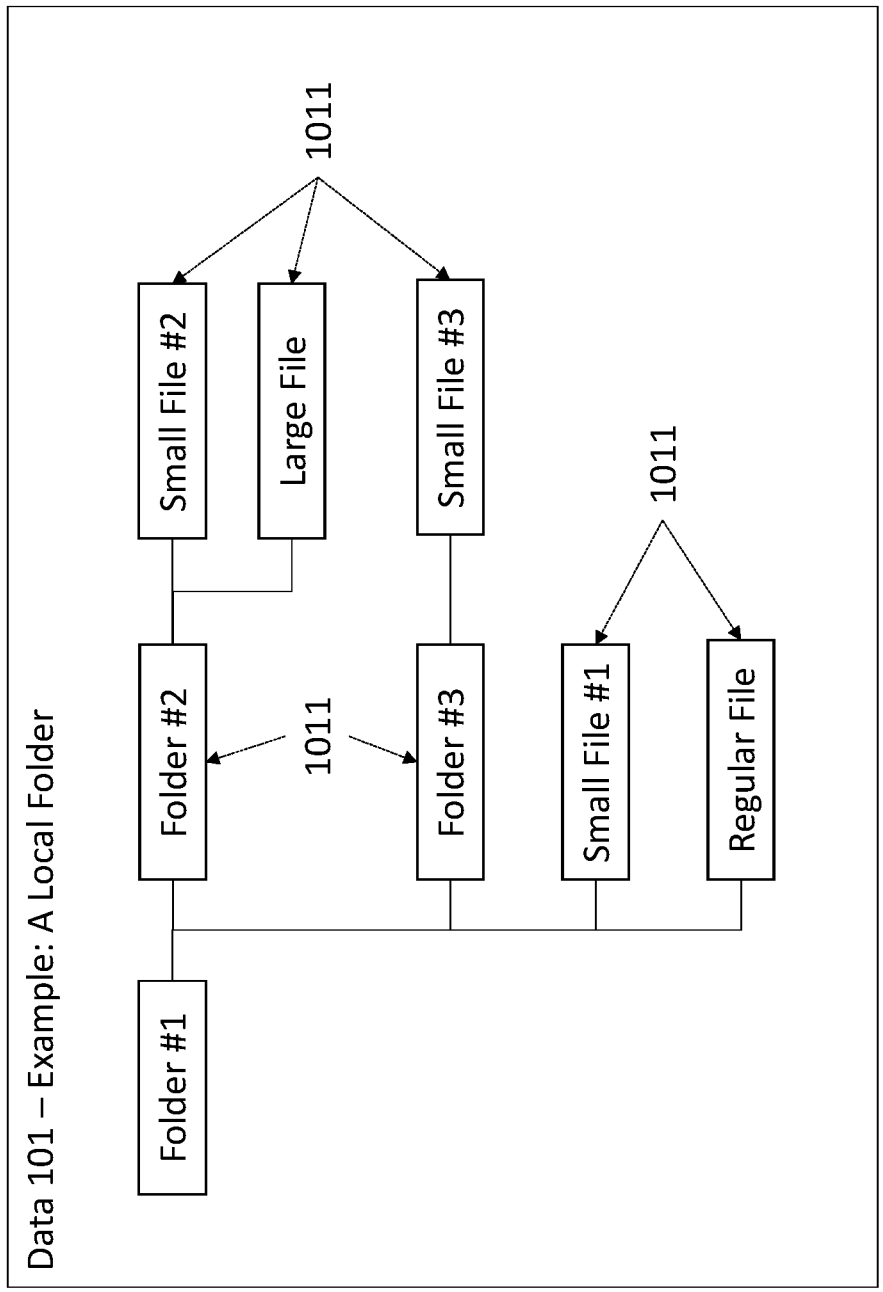
FIG. 2B – User Data or Data: An Example

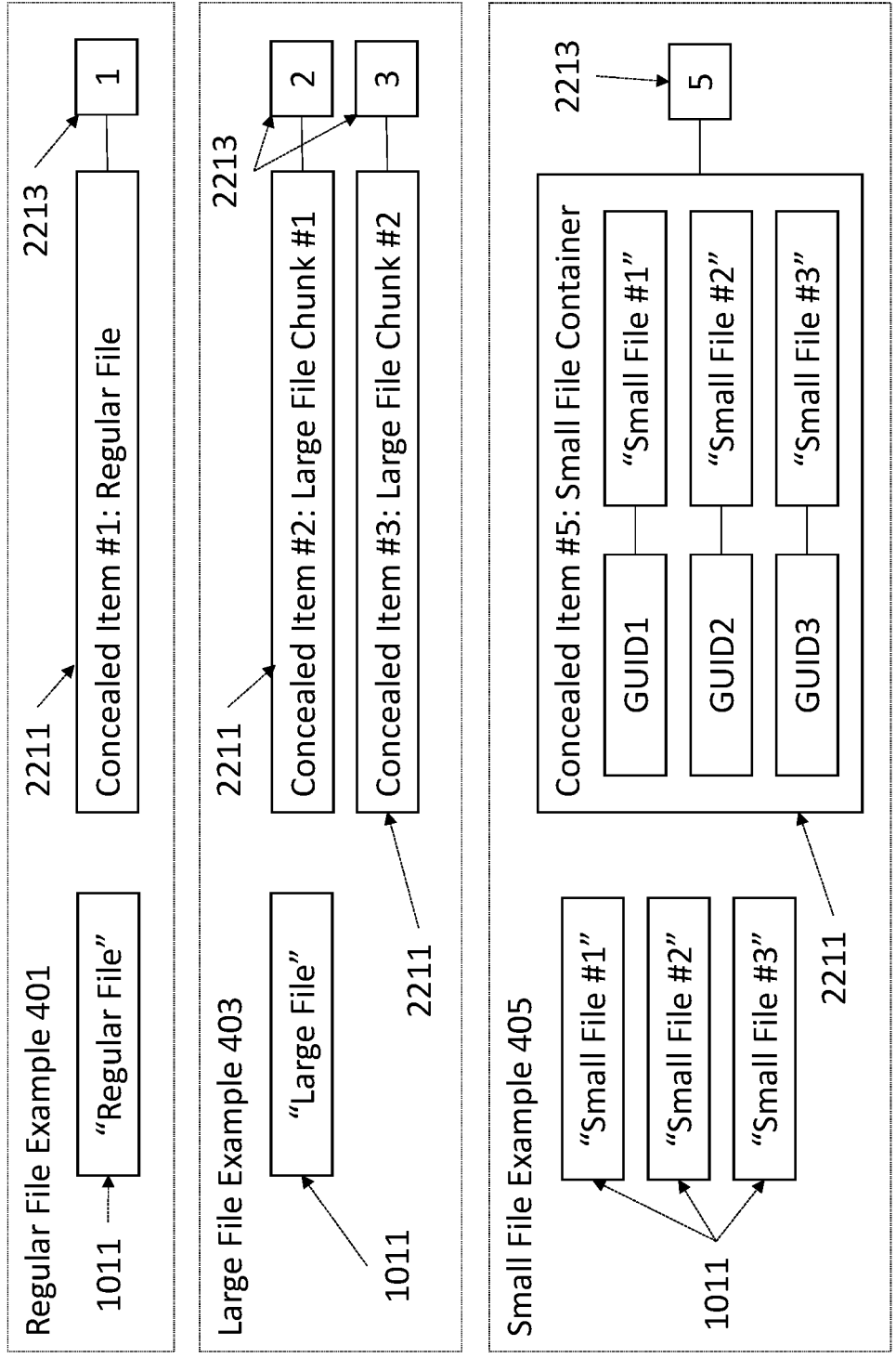
FIG. 2C – Data Items and Concealed Items: Examples

FIG. 2D – Metadata Items: Examples

Metadata Item 2231 – Example: "Regular File"

Path: "Regular File", Type: File, Timestamps, Size, Hash, (1)

Metadata Item 2231 – Example: "Large File"

Path: "Folder #2/Large File", Type: File, Timestamps, Size, Hash, (2,3)

Metadata Item 2231 – Example: "Small File #2"

Path: "Folder #2/Small File #2", Type: File, Timestamps, Size, Hash, (5,03AA505D-4B3C-44D2-82E6-09F4AC771D74)

Metadata Item 2231 – Example: "Folder #3"

Path: "Folder #3", Type: Folder, Timestamps

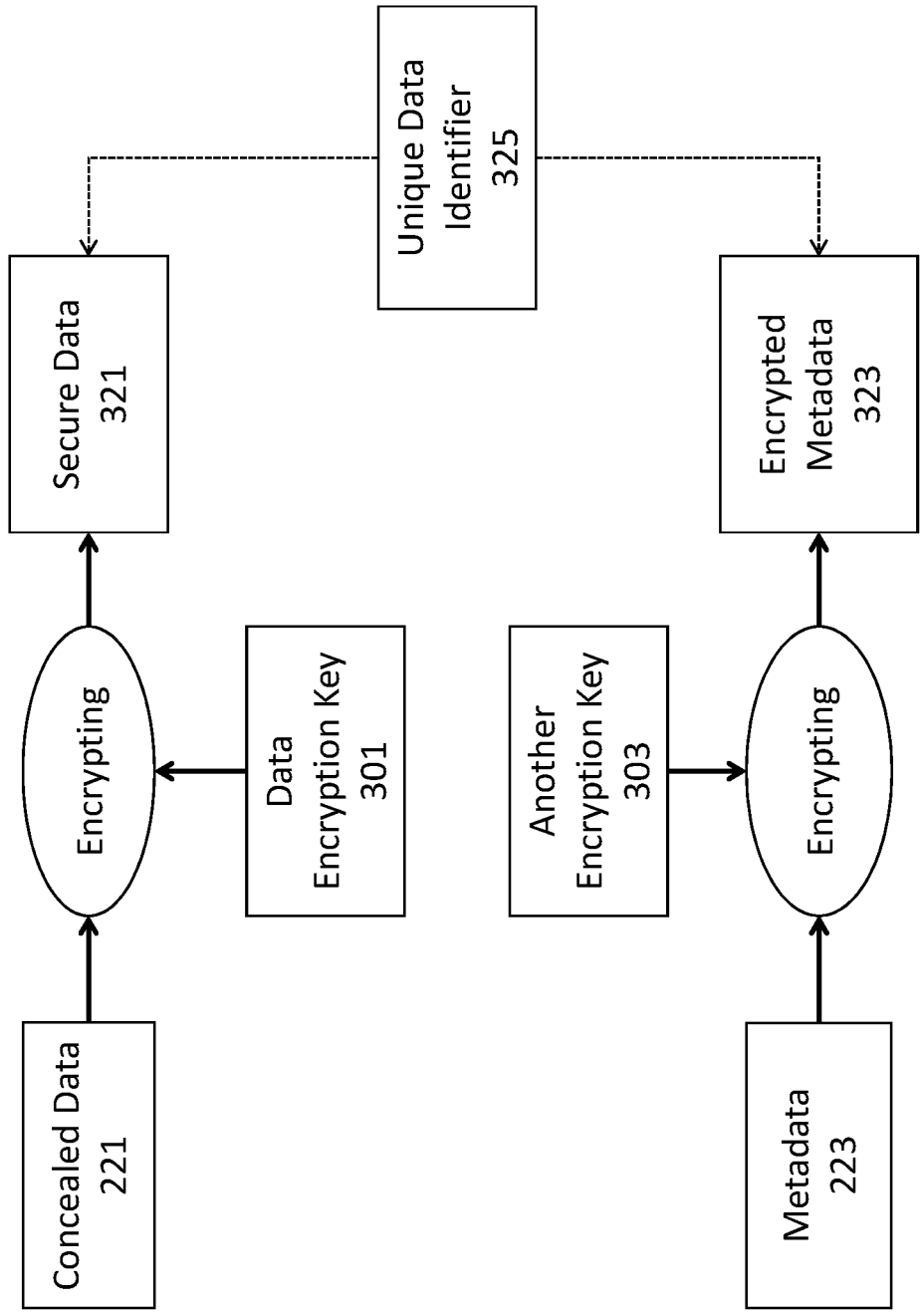
FIG. 3 - Encrypting Concealed Data and Metadata

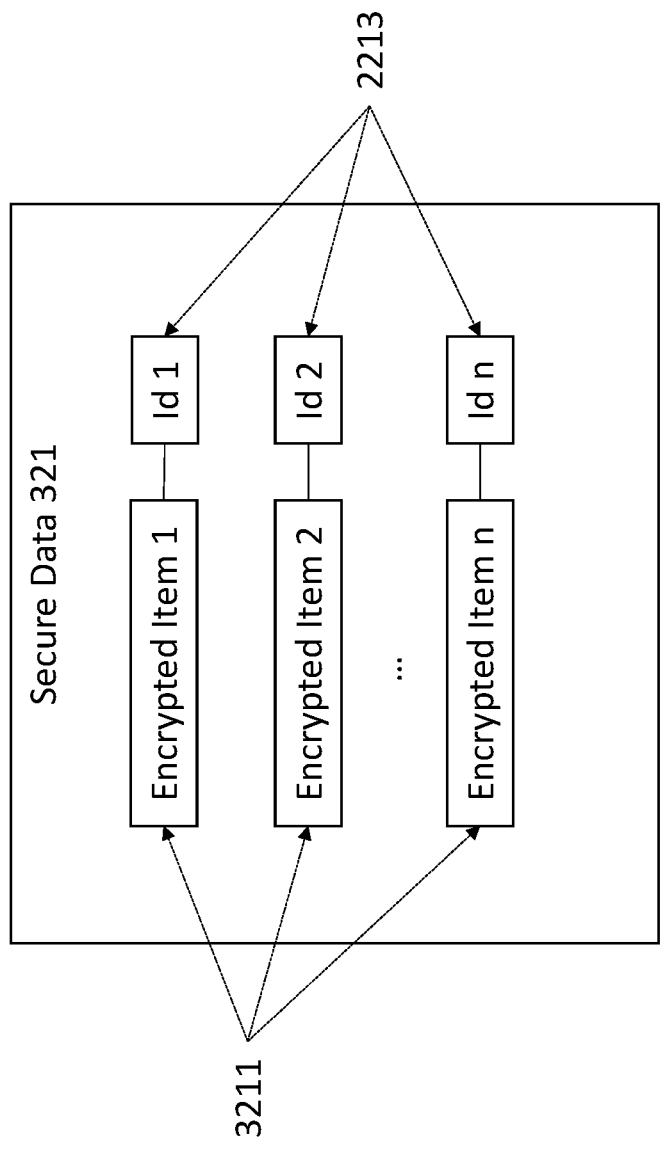
FIG. 3A – Secure Data

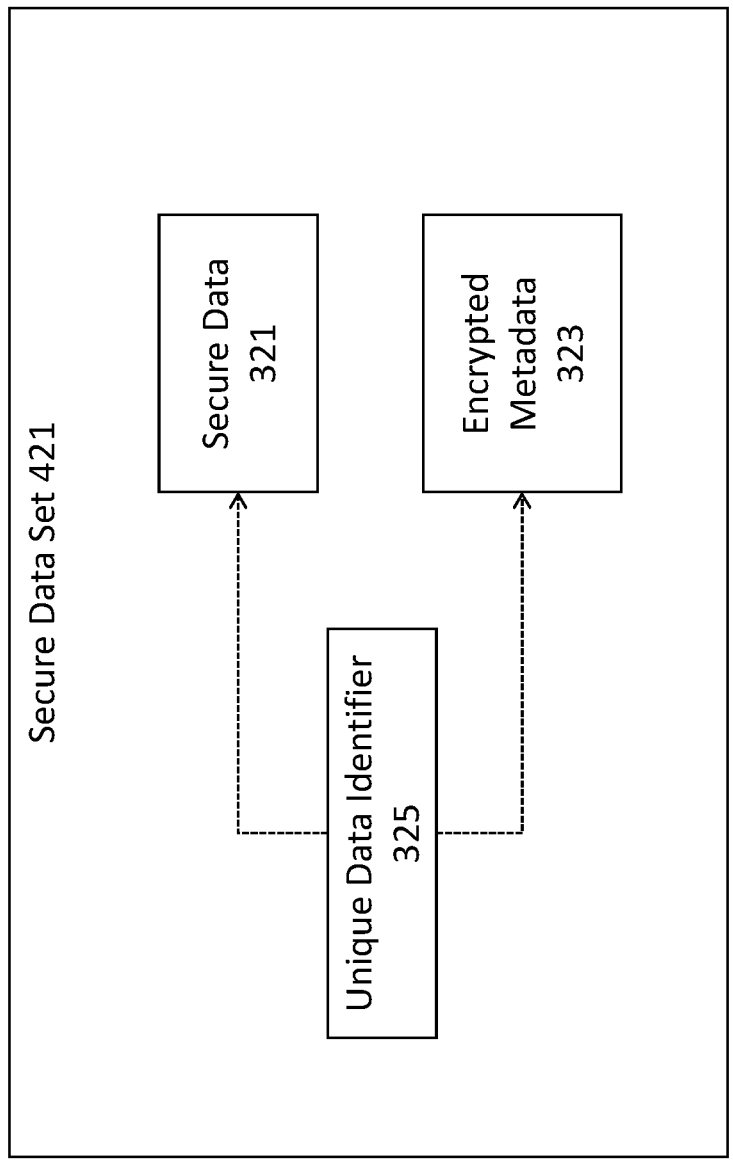
FIG. 4 – Secure Data Set

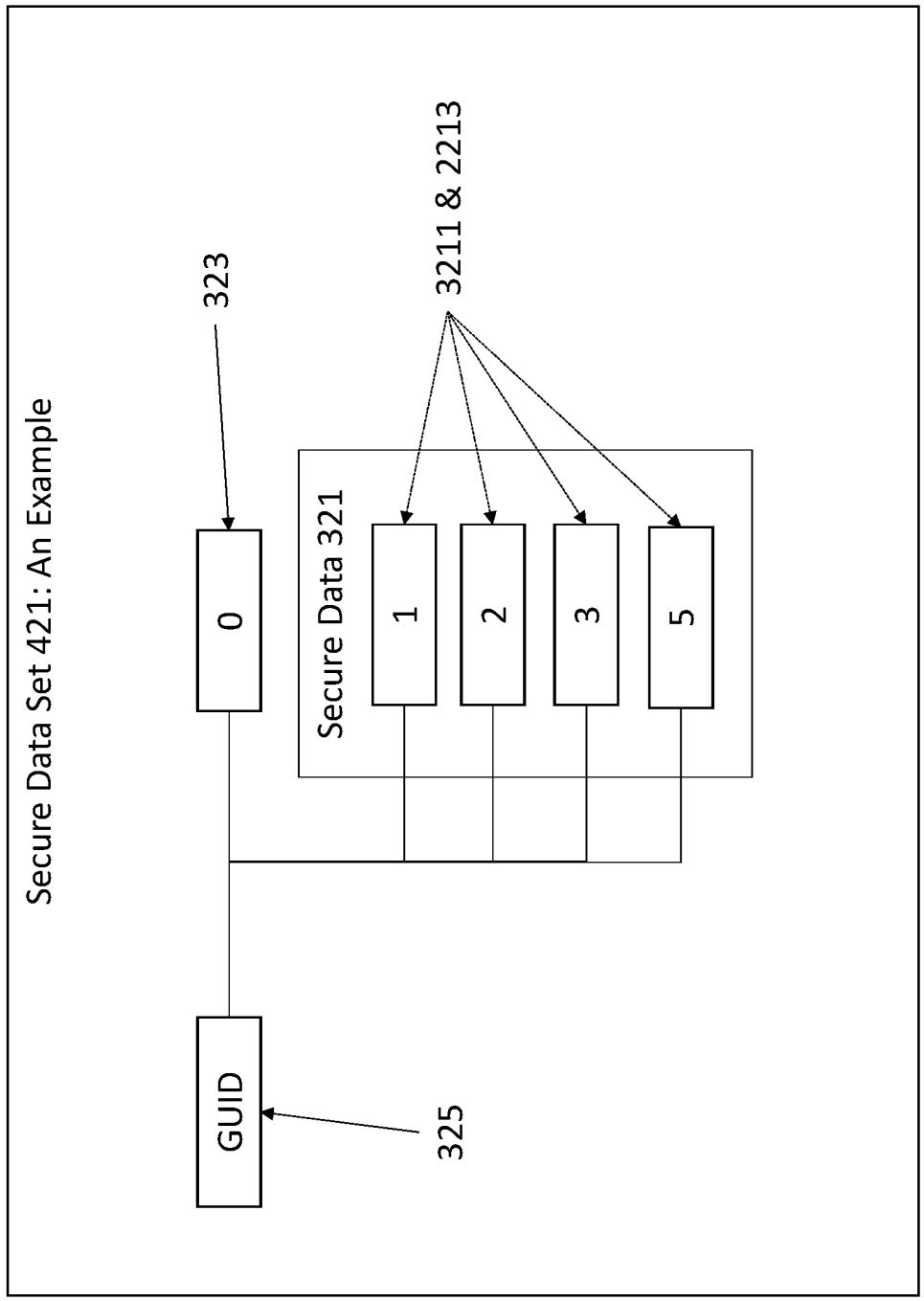
FIG. 4A – Example: Storing Secure Data Set

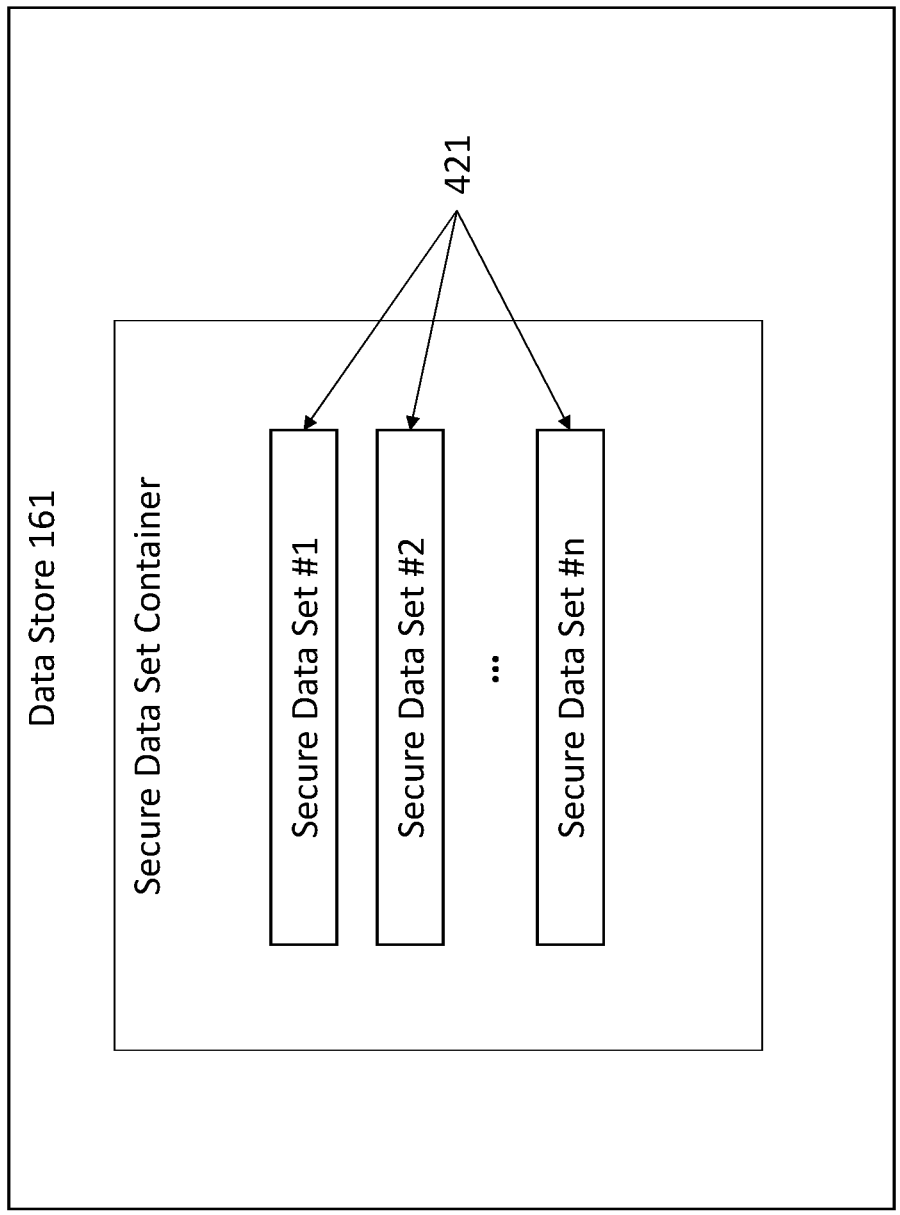
FIG. 4B – Secure Data Set Container

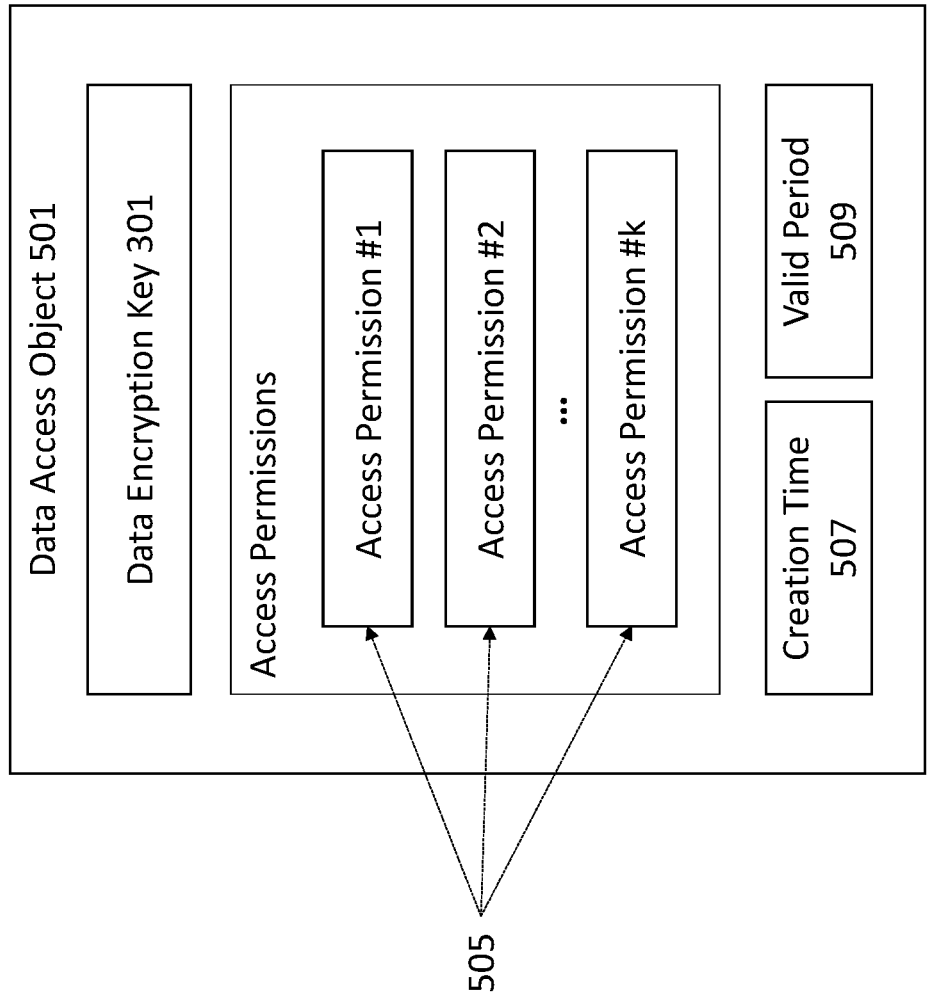
FIG. 5 – Data Access Object

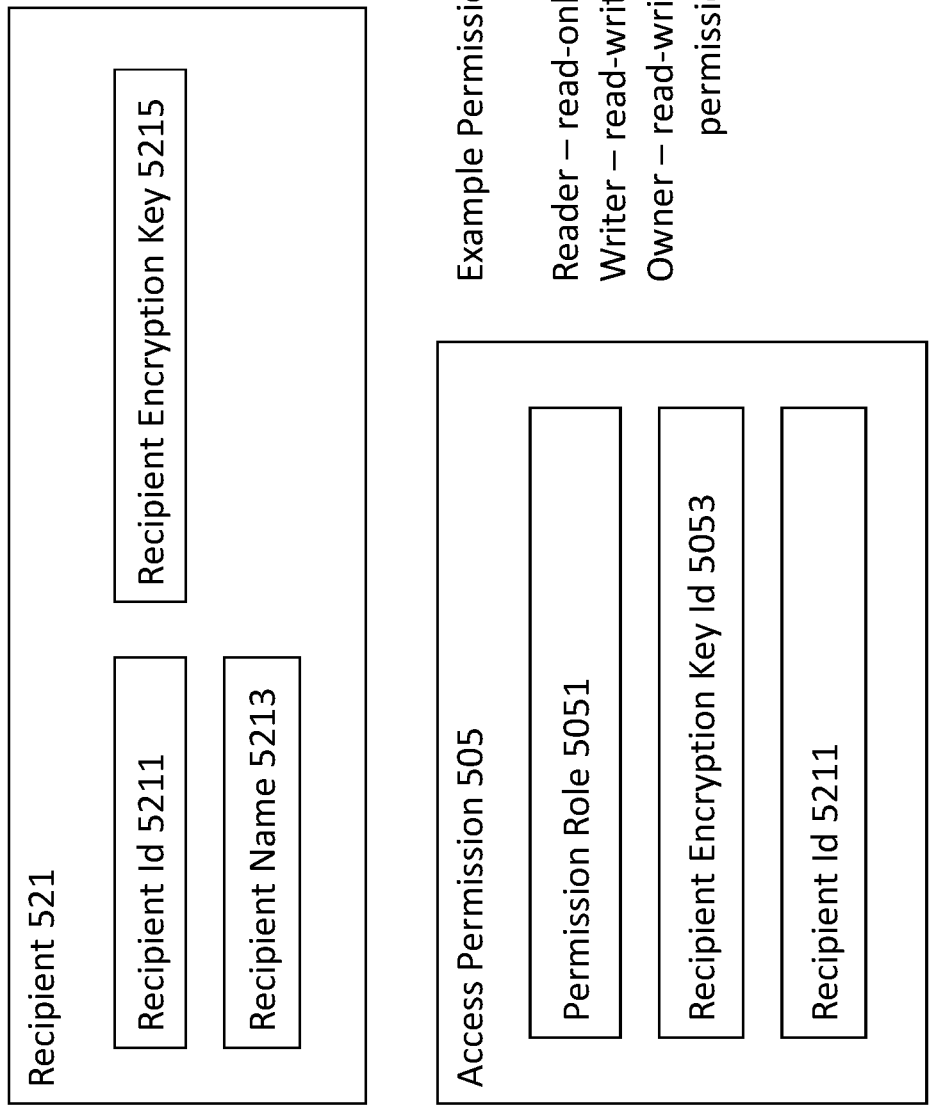
FIG. 5A – Recipient, Access Permission and Permission Role

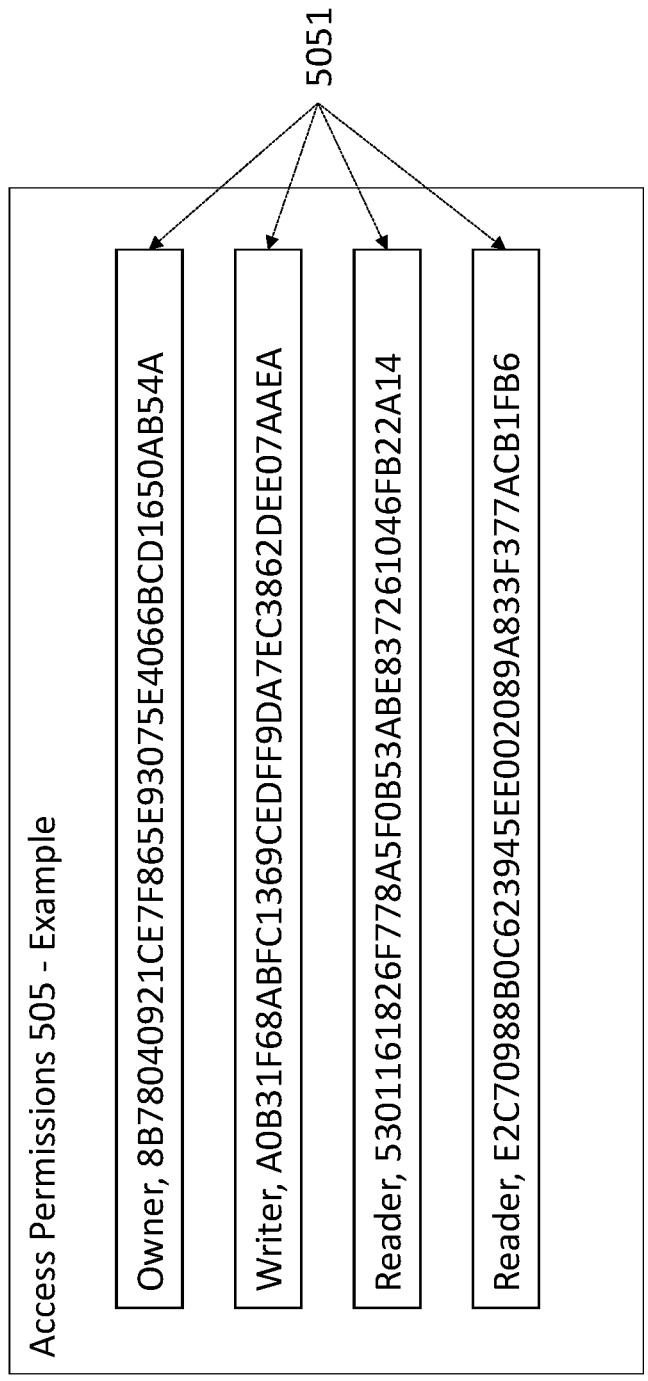
FIG. 5B – Access Permission Examples

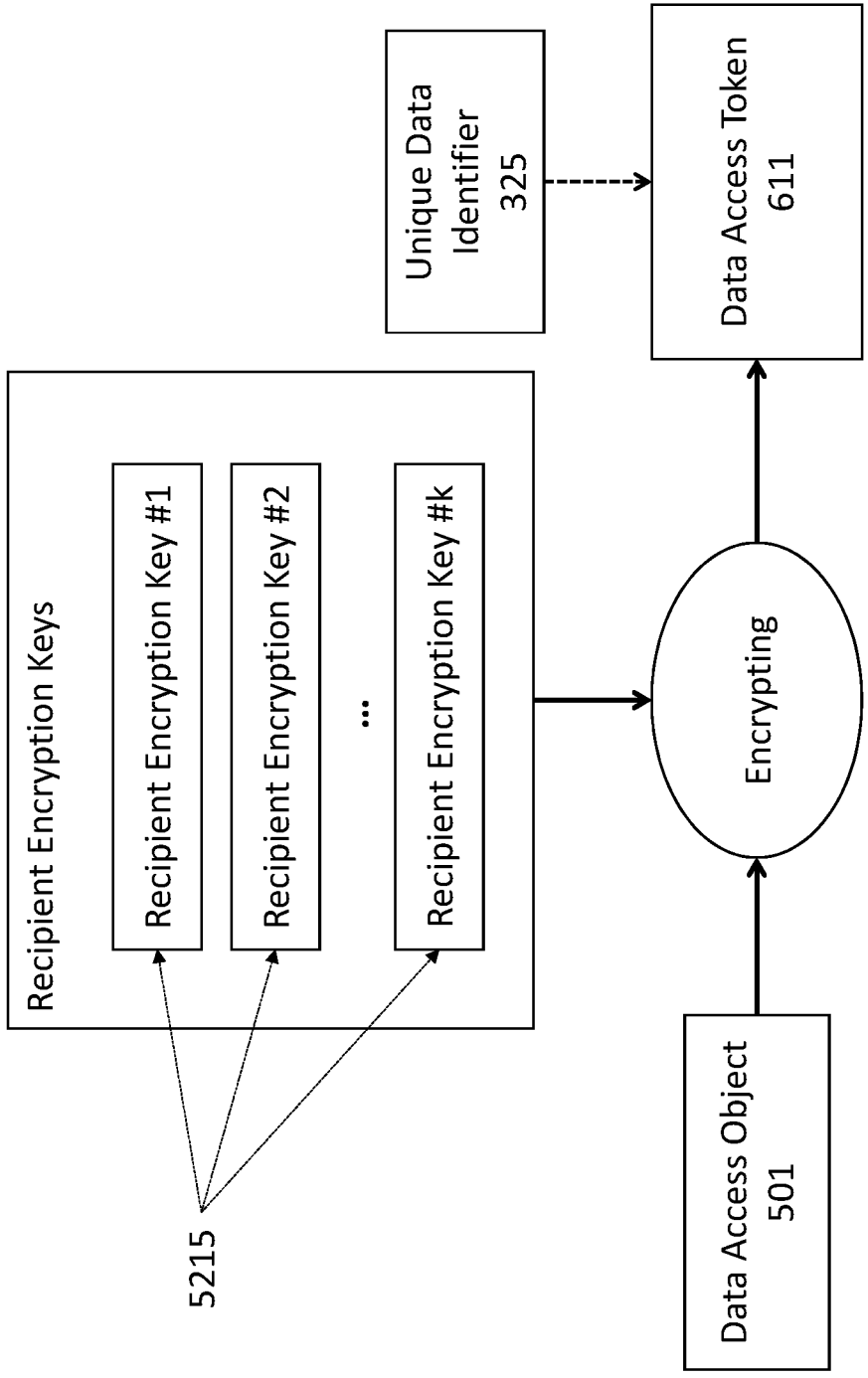
FIG. 6 – Encrypting Data Access Object

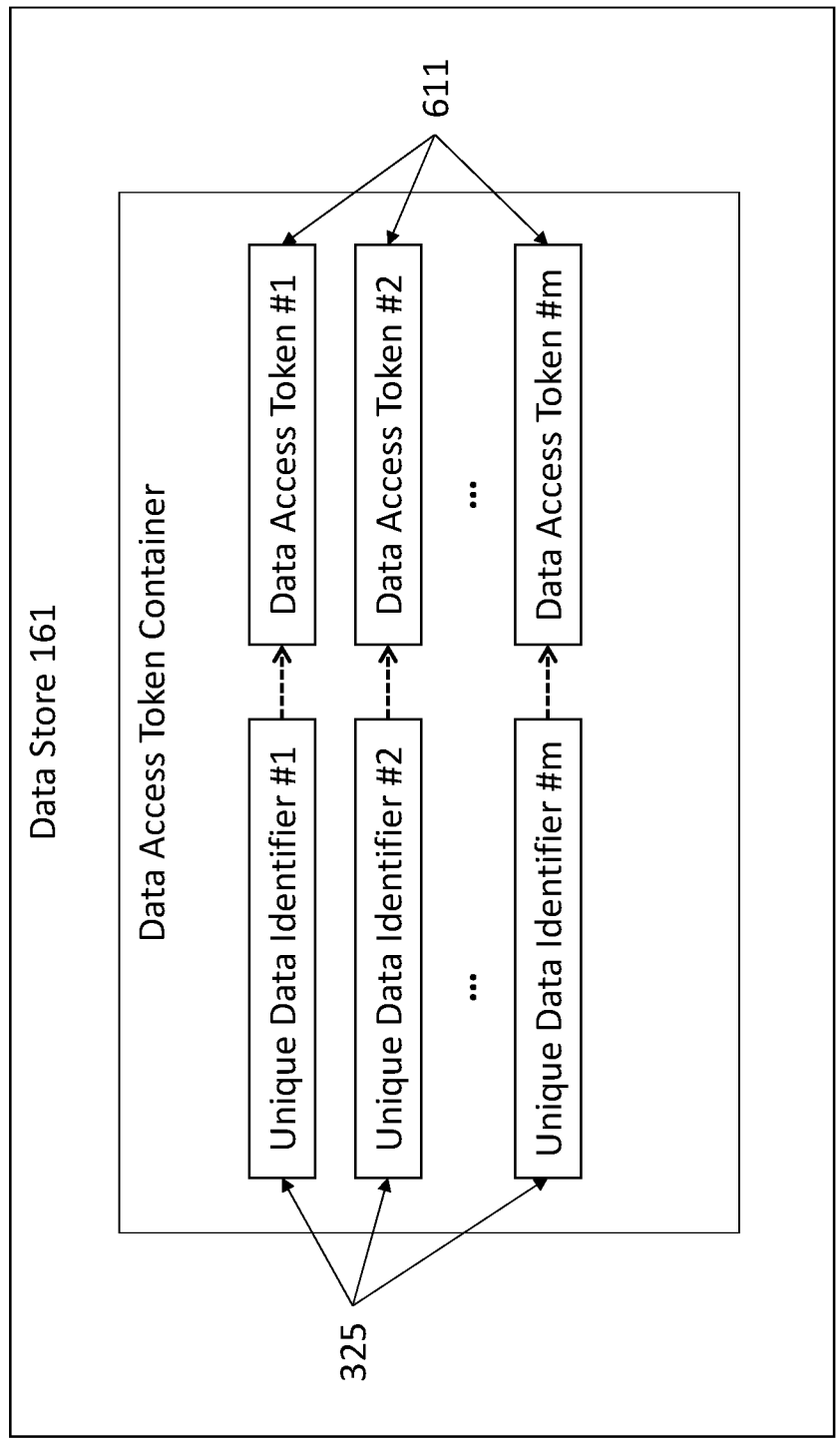
FIG. 6A – Storing Data Access Token

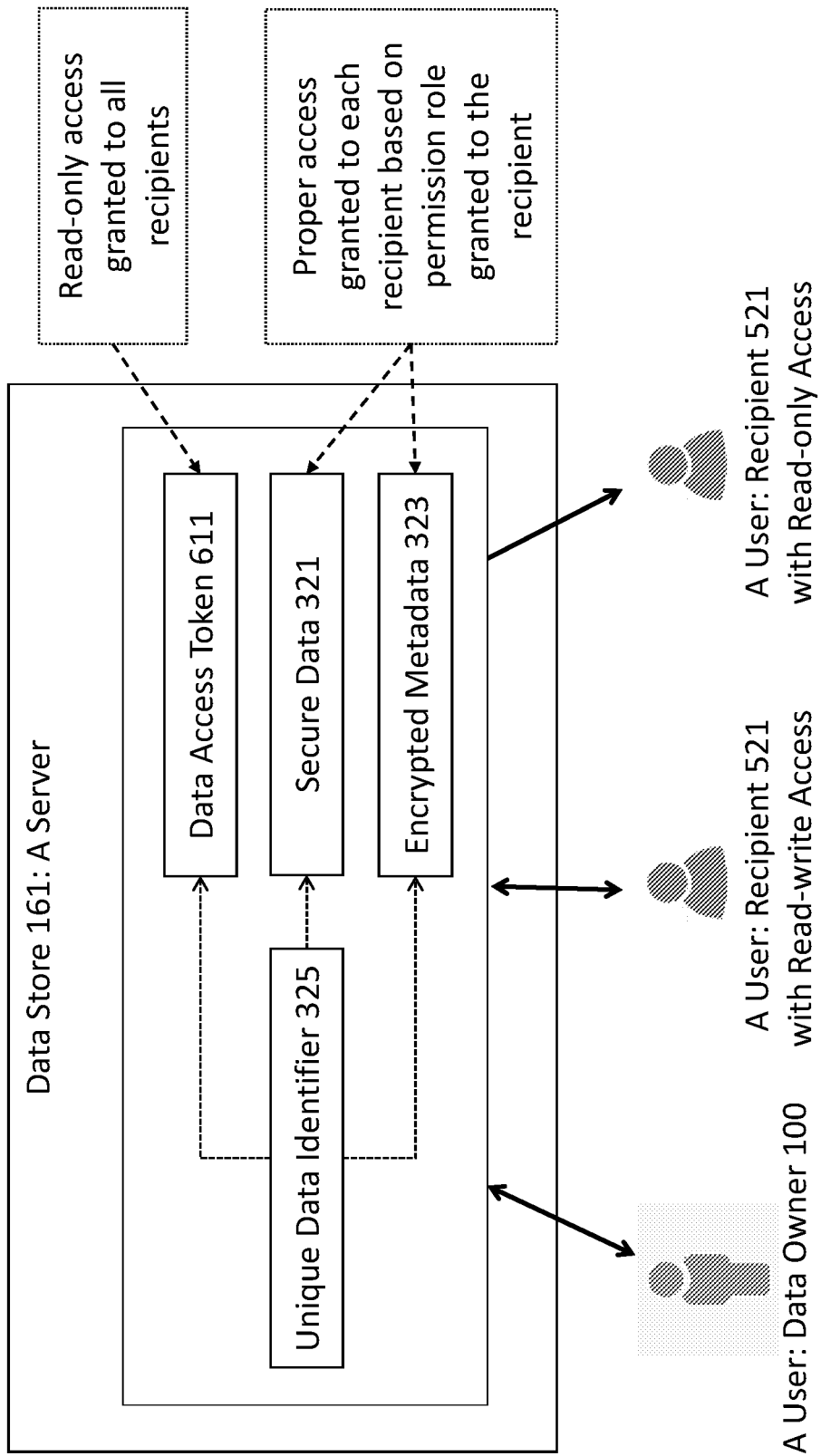
FIG. 7 – A Server as Data Store

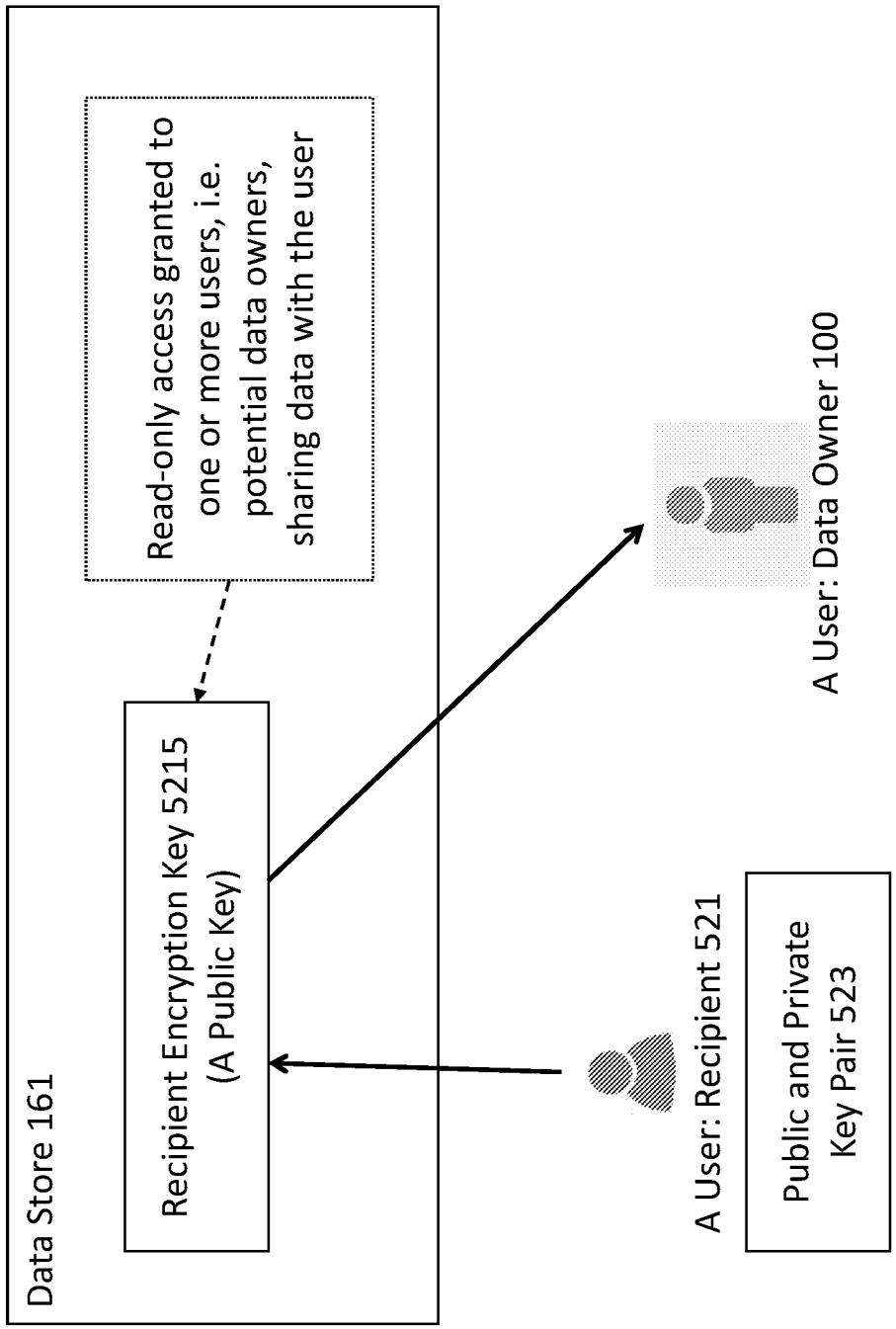
FIG. 8 – Distributed Public Key Distribution Using a Server as Data Store

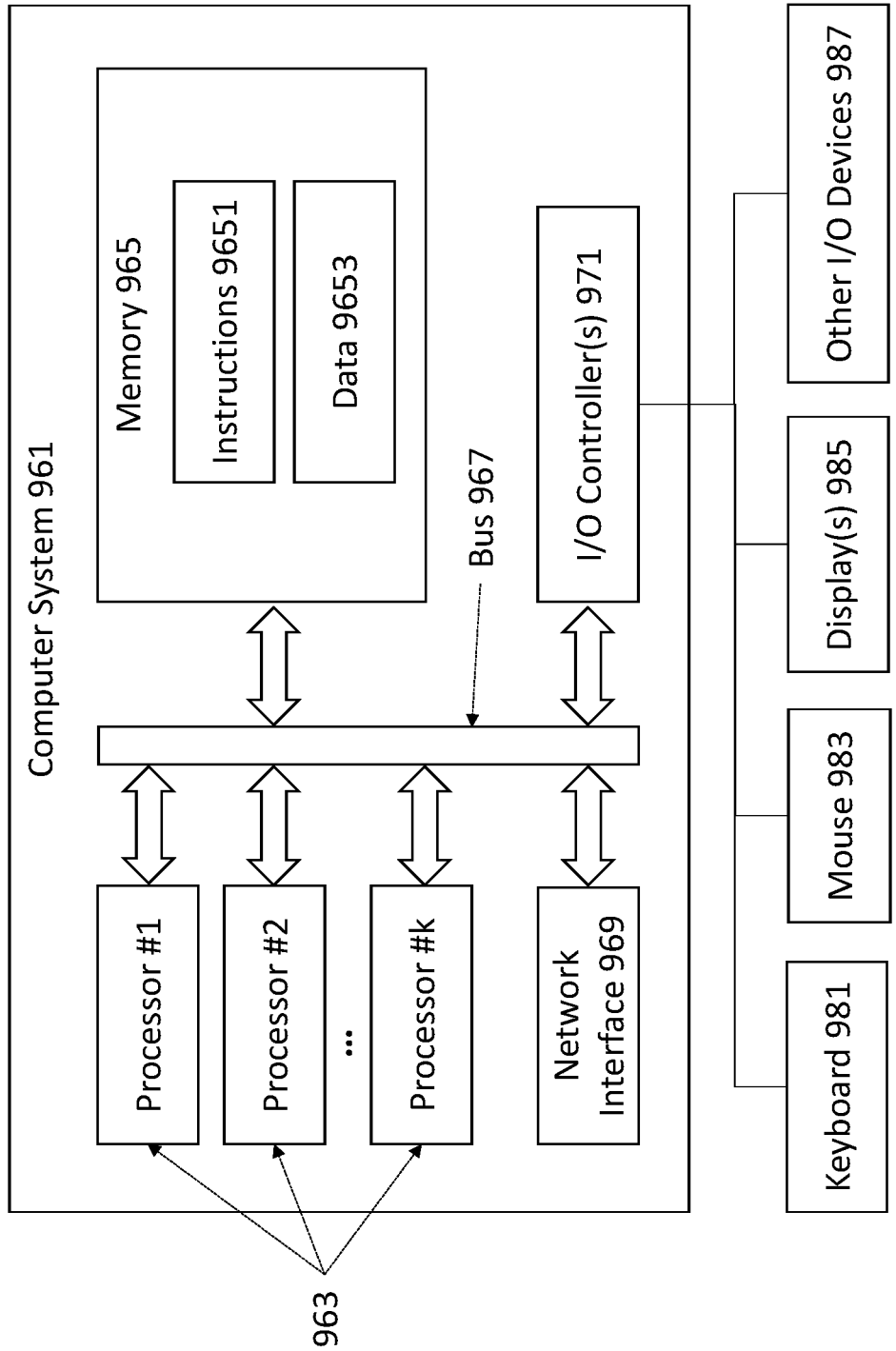
FIG. 9 – Computer System

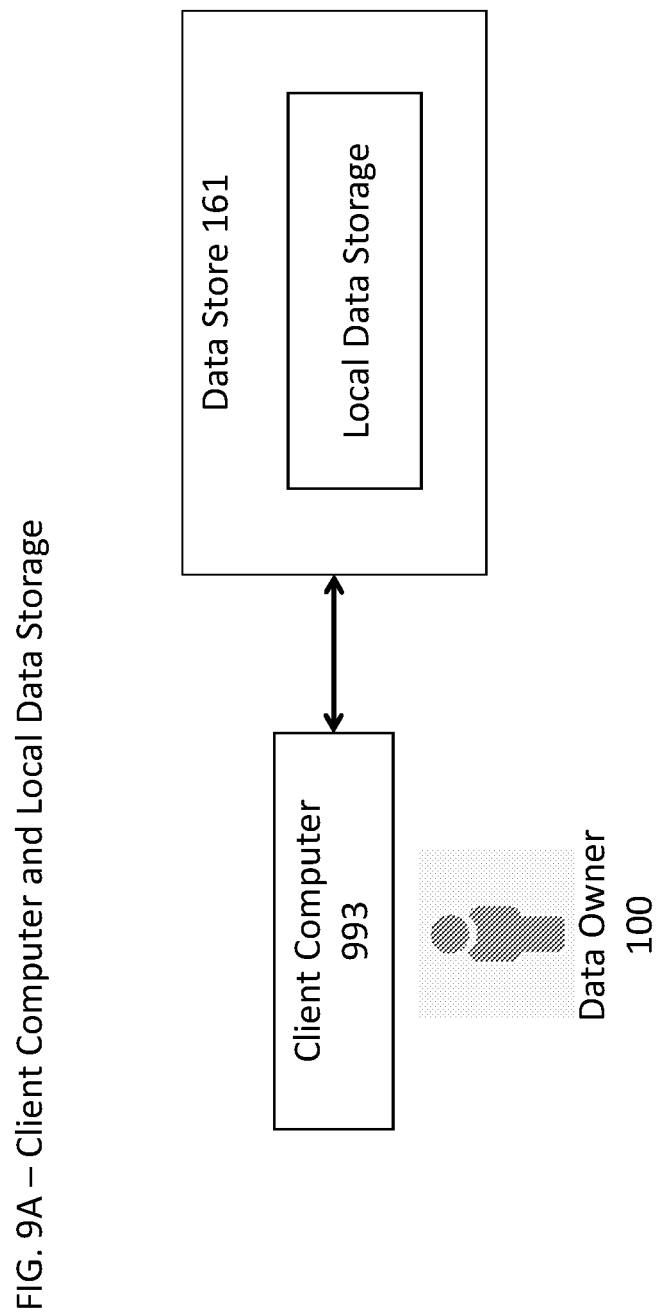
FIG. 9A – Client Computer and Local Data Storage

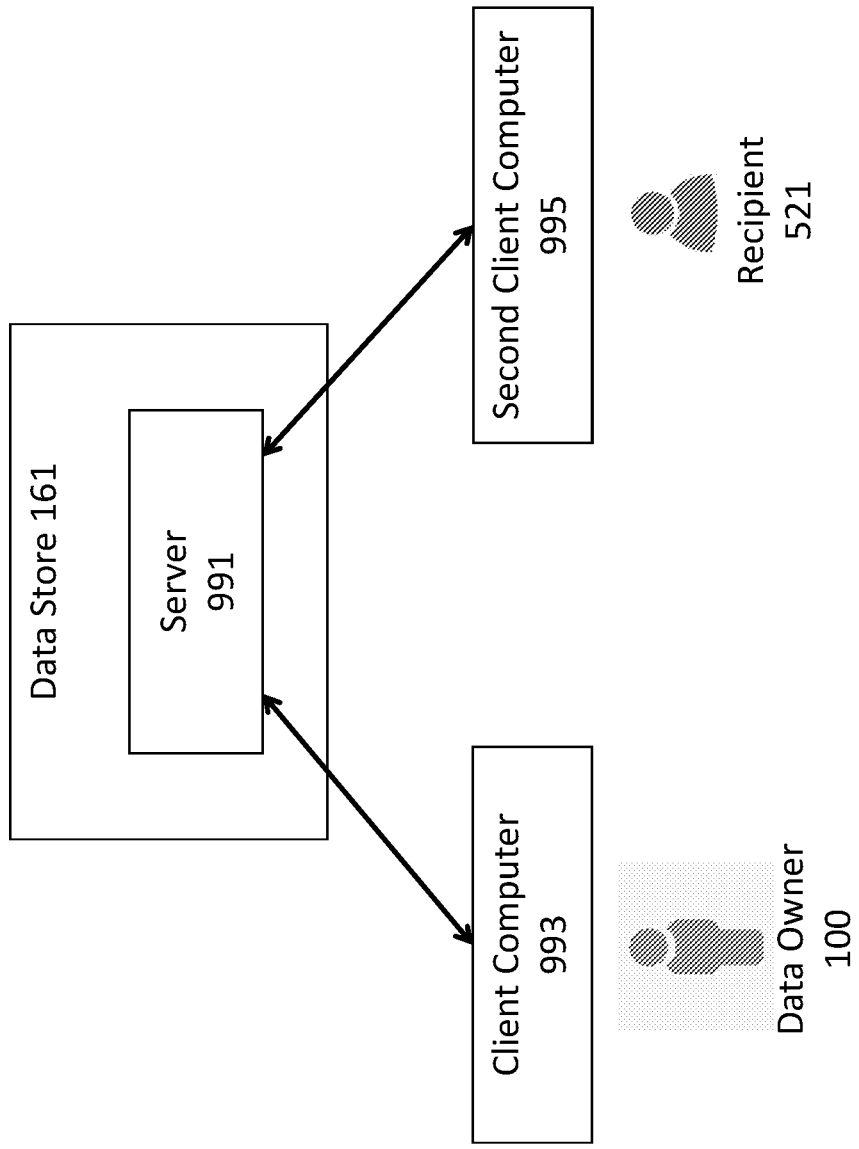
FIG. 9B – Client Computer and Server

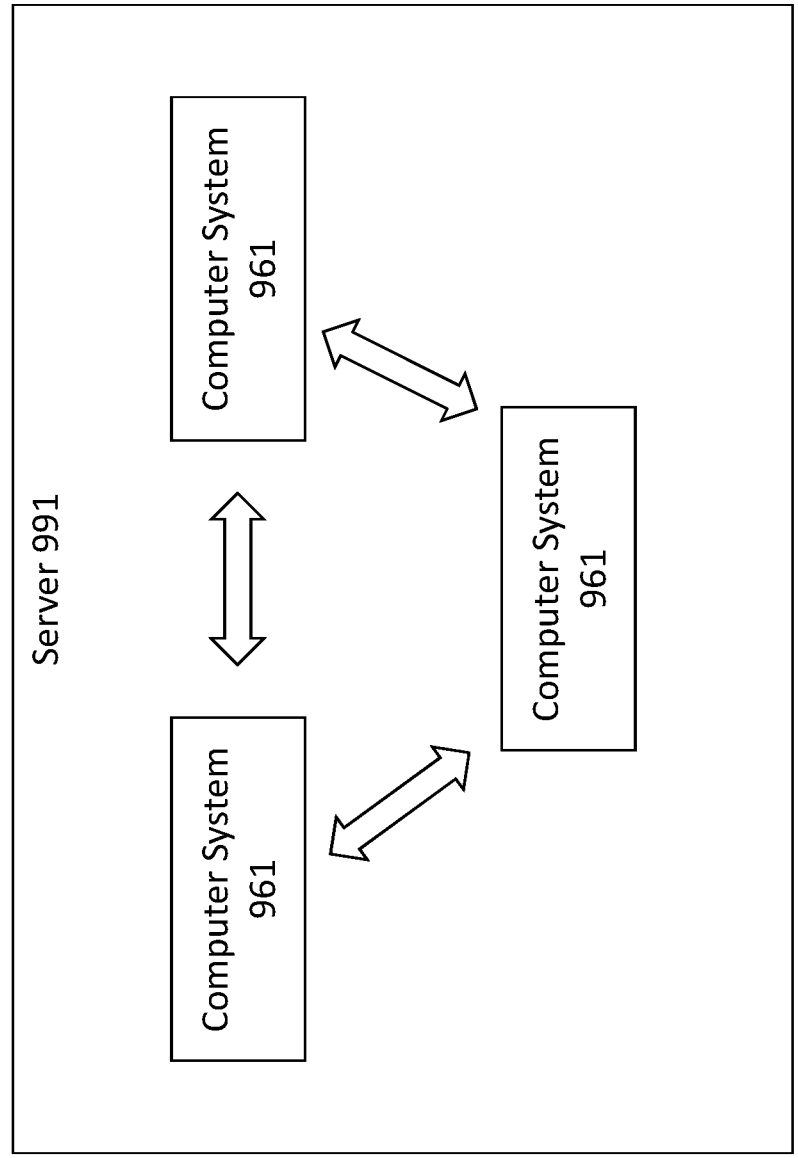
FIG. 9C – A Server Farm

METHOD AND SYSTEM FOR SECURING DATA

TECHNICAL FIELD

This invention relates to data security, and more particularly relates to enabling data owners to take control of their data through the use of encryption and access control in a distributed manner.

BACKGROUND

Data is one of the most important assets for organizations and individuals. Data loss or data breach can be very costly for both organizations and individuals. At the very least, critical data loss or breach will have a financial impact on organizations of all sizes.

As cloud storage and data sharing and collaboration become cheaper and better, more and more organizations and individuals move their data to cloud. This provides a central place for a hacker to break into the system to steal data. A cloud administrator with malicious intent may also be able to steal data. Examples of data theft and data breaches are not uncommon, even though all vendors declare that data is safe with them.

There is a strong need for a method and system that ensure the security of the data stored in cloud, and enable data owners to take over control of their own data, even when the data is stored in a public cloud, such as Google Drive, Microsoft OneDrive and Box, and to share data with other people securely and confidently, knowing only intended people have access to the data. In case of a data breach the impact would be limited to an individual user instead of system wide.

SUMMARY

Methods and systems are provided to enable data owners to take control of their data through the use of encryption and access control in a distributed manner that the impact of a data breach will be limited to an individual user, not system wide.

A first aspect of the present invention provides a method for securing data, comprising: devising a concealing mechanism; concealing, according to said concealing mechanism, and encrypting, using a data encryption key, said data to generate secure data and metadata, such that said data can be reconstructed by using said secure data, said metadata and said data encryption key in accordance with said concealing mechanism; encrypting said metadata with another encryption key to generate encrypted metadata; saving said secure data and said encrypted metadata to a data store, and associating a unique data identifier with said secure data and said encrypted metadata in said data store, such that said secure data and said encrypted metadata are uniquely identifiable in said data store.

A second aspect of this invention provides a system for securing data, comprising: a data store configured to allow said data owner to store data; a client computer having at least one processor, a network interface, and a machine-readable medium storing instructions that, when executed by said at least one processor, cause said at least one processor to perform operations, on behalf of said data owner, comprising: generating a data encryption key; concealing, according to a concealing mechanism, and encrypting, using said data encryption key, said data to generate secure data and metadata, such that said data can be reconstructed by using said secure data, said metadata and said data encryption key in accordance with said concealing mechanism; encrypting said metadata with said data encryption key to generate encrypted metadata; generating a unique data identifier; saving said secure data and said encrypted metadata to said data store, and associating said unique data identifier with said secure data and said encrypted metadata in said data store, such that said secure data and said encrypted metadata are uniquely identifiable in said data store.

A third aspect of this invention provides a system for distributing the public key of a user to other users to enable secure data sharing, in a distributed manner, comprising: a client computer having at least one processor, a network interface, a user interface, and a machine-readable medium; a server, configured to allow users of said server to store data, share data with other users and grant said other users read-only access to data in said server, having: at least one processor; a network interface configured to receive requests from said network interface on said client computer; and a machine-readable medium storing instructions that, when requested by said client computer, are executed by said at least one processor on said server, and cause said at least one processor on said server to perform the operations requested by said client computer; wherein said machine-readable medium on said client computer storing instructions that, when executed by said at least one processor on said client computer, cause said at least one processor on said client computer to perform operations, including sending requests to said server when necessary, on behalf of a user, comprising: uploading the public key of a public and private key pair owned by said user to said server; selecting one or more users by said user using said user interface on said client computer; sharing said public key, stored on said server, with said one or more users, and granting said one or more users read-only access to said public key; thereby said public key is made accessible to said one or more users; and said user controls who are allowed to access said public key, thus controls who are allowed to share data securely with said user.

BRIEF DESCRIPTION OF THE DRAWINGS

FIG. 1 depicts an operating environment in at least one embodiment.

FIG. 2 depicts the data concealing process that produces concealed data and metadata in at least one embodiment.

FIG. 2A depicts data, metadata and concealed data in at least one embodiment.

FIG. 2B depicts an example of user data or data for illustration purpose.

FIG. 2C depicts examples of data items and concealed items generated from the example data according to a concealing mechanism.

FIG. 2D depicts examples of metadata items generated from the example data according to a concealing mechanism.

FIG. 3 depicts the concealed data and metadata encrypting process that produces secure data and encrypted metadata in at least one embodiment.

FIG. 3A depicts secure data in at least one embodiment.

FIG. 4 depicts secure data set in at least one embodiment.

FIG. 4A depicts the secure data set generated from the example data.

FIG. 4B depicts secure data set container in at least one embodiment.

FIG. 5 depicts data access object in at least one embodiment.

FIG. 5A depicts recipient and access permission in at least one embodiment.

FIG. 5B depicts examples of access permission with permission role and recipient encryption key Id.

FIG. 6 depicts the process of generating data access token in at least one embodiment.

FIG. 6A depicts data access tokens stored in a container of a data store in at least one embodiment.

FIG. 7 depicts a server used as data store in at least one embodiment.

FIG. 8 depicts distributing the public key from a recipient owning a public and private key pair to a data owner in at least one embodiment.

FIG. 9 depicts a schematic block diagram illustrating one embodiment of a computer system that may be used in accordance with certain embodiments of the system for securing user data or data.

FIG. 9A depicts a client computer and a local data storage in at least one embodiment.

FIG. 9B depicts a client computer used by a data owner, a server as data store, and a second client computer used by a recipient in at least one embodiment.

FIG. 9C depicts a server farm as server and data store in at least one embodiment.

DETAILED DESCRIPTION

As will be appreciated by one skilled in the art, aspects of the present invention may be embodied as methods, systems or computer program products. This section describes in details embodiments of the invention and references the drawings. The embodiments described herein are by way of example only and that the scope of the invention is not intended to be limited thereby.

FIG. 1 illustrates an operating environment in which a data owner 100 stores user data or data 101 in a data store 161 in such a secure manner that the data owner 100 has control over the data no matter what the data store 161 is and where it is located, and only the intended recipients 521 have access to the data. Data 101 goes through a protecting process before it reaches data store 161. In at least one embodiment, data store 161 may be a local hard disk, a writable CD disk, a database or a cloud storage system, or any other type of storage system.

Refer to FIG. 2 and FIG. 3, in at least one embodiment, the protecting process is a combination of data concealing according a concealing mechanism and data encryption with one or more encryption keys.

As illustrated in FIG. 2, according to at least one embodiment, a concealing mechanism 203 is devised based on the type of the original data 101 to be secured. Its main purpose is to transform original data 101 to a different form and to extract metadata 223 from the original data, so that the original data can be reconstructed by using the transformed data, called concealed data 221, and the extracted metadata 223. The concealed data 221 and the metadata 223 are then encrypted to ensure confidentiality. In addition, the concealing mechanism 203 may also transform the data 101, in at least one embodiment, to make it more suitable for storing. For example, a huge file may be split into smaller chunks before it is encrypted and uploaded to a cloud storage.

In some embodiments, data 101 comprises one or more data item 1011 as shown in FIG. 2A, and a concealing mechanism 203 transforms data 101 to concealed data 221 that is a collection of concealed items 2211 and their corresponding unique identifiers or Ids 2213, and generates metadata 223 that is a collection of metadata items 2231 corresponding respectively to data items 1011 of data 101.

As an example, the data 101 we use in the following description is a local folder named "Folder #1" in a local computer file system as illustrated in FIG. 2B. This example data 101 contains a total of seven data items 1011, which are, two folders (named "Folder #2" and "Folder #3"), one large file (named "Large File"), one regular file (named "Regular File") and three small files (named "Small File #1", "Small File #2" and "Small File #3"). The concealing mechanism 203 for this example comprises the following: 1. Define a minimum size and a maximum size for files; and use the counting numbers (that is 1, 2, 3, 4, 5, and so on), called numbers for short from now on, as Ids 2213 of concealed items 2211; 2. Enumerate through all the files and folders, i.e. all data items 1011, within "Folder #1", i.e. data 101; 3. Pick a data item 1011, that is either a file or a folder; 4. Create a metadata item 2231 comprising the relative path, the type and the timestamps of the data item 1011; 5. If the data item 1011 is a file, then the metadata item 2231 also comprises the size and hash value of the data item 1011, and the file is transformed or concealed in the following manner: a. if the size of the file is greater than the defined maximum size, it is called a "large file", and its content is split into two or more chunks, where the size of each chunk is no greater than the defined maximum size; each chunk is called a concealed item 2211, and is assigned a unique number as its Id 2213; store all unique number Ids 2213 corresponding respectively to the chunks in the metadata item 2231, and in the order the content is split; b. if the size of the file is smaller than the defined minimum size, it is called a "small file"; the content of the "small file" is packed into a "small file container" having a unique number Id 2213, and is given a unique name within the container; store the unique number Id 2213 and the unique name in the metadata item 2231; the number of "small files" within the container grows as new small files are added to the container until the total size of all "small files" within the container is greater than or equal to the defined maximum size; at this point the "small file container" is then sealed and called a concealed item 2211, and its assigned unique number is its Id 2213; a new "small file container" is created as needed to accommodate new "small files", and is assigned a new unique number as its Id 2213; c. if the size of the file is between the defined minimum and maximum sizes, it is called a "regular file"; the content of the file becomes a concealed item 2211 and is assigned a unique number as its Id 2213; store the unique number Id 2213 in the metadata item 2231; 6. Go back to step 3 until done with all files and folders under "Folder #1".

After applying the above concealing mechanism 203 to the example data 101 illustrated in FIG. 2B, concealed data 221 and metadata 223 corresponding to the example data 101 are generated and illustrated in FIG. 2C and FIG. 2D.

The concealed items 2211 corresponding to the example data are illustrated in FIG. 2C. For the regular file named "Regular File", there is one corresponding concealed item 2211, associated with number 1 as its Id. For the large file named "Large File", there are two corresponding concealed items 2211, associated with numbers 2 and 3 as their Ids 2213 respectively. The three small files "Small File #1", "Small File #2" and "Small File #3" are packed into a "small file container" as concealed item 2211 associated with number 5 as its Id 2213. Inside the "small file container" stores the contents of the three small files identified by the three globally unique identifiers, or GUIDs, as their unique names respectively. Because multiple "small files" are packed into one "small file container" and some data items are folders, the total number of concealed items 2211 is no greater than the total number of data items 1011. The number Id 2213 associated with each concealed item 2211 can be sequential or random as long as they are unique within the concealed data 221.

As illustrated in FIG. 2D, each metadata item 2231 comprises the path relative to "Folder #1", the type and the timestamps (may include creation time, last access time and last write time) of the corresponding data item 1011. If a data item 1011 is a file, its item metadata 2231 also comprises the size, the hash value and the relationship with concealed items 2211 within the corresponding concealed data 221, wherein the relationship is illustrated as a number or numbers or a number and a GUID enclosed in parentheses. For the example data 101, the metadata item 2231 corresponding to the regular file named "Regular File" has the number 1 enclosed in parentheses, indicating that there is only one associated concealed item 2211 identified by the unique Id 1; the metadata item 2231 corresponding to the large file named "Large File" has two numbers 2 and 3 enclosed in parentheses, indicating that there are two associated concealed items 2211 identified by the unique Ids 2 and 3 respectively and in that order; the metadata item 2231 corresponding to the small file named "Small File #2" has the number 5 along with a GUID 03AA505D-4B3C-44D2-82E6-09F4AC771D74 enclosed in parentheses, indicating that there is only one associated concealed item 2211 that is a small file container, and that the content of the small file is stored in the small file container and is identified by the specified GUID within the container. The metadata item 2231 for the folder named "Folder #3" is also illustrated in FIG. 2D. The total number of metadata items 2231 is 7 since the total number of data items 1011 is 7.

Refer to FIG. 2A, FIG. 3 and FIG. 3A, in at least one embodiment, concealed data 221 is encrypted by using a data encryption key 301, obtained or randomly generated, to generate secure data 321. Encrypting concealed data 221 to generate secure data 321 comprises: 1. Enumerating through concealed items 2211 within concealed data 221; 2. Picking a concealed item 2211, compress it and then encrypt it with the data encryption key 301 to generate encrypted item 3211, and associating the encrypted item 3211 with the Id 2213 of the corresponding concealed item 2211; 3. Go back to step 2 until all concealed items 2211 within concealed data 221 are processed.

The metadata 223 is encrypted with another encryption key 303 to generate encrypted metadata 323. In at least one embodiment, the another encryption key 303 is the same as the data encryption key 301 to simplify encryption key management.

As illustrated in FIG. 4, in at least one embodiment, the secure data 321 and the encrypted metadata are associated with a unique data identifier 325, therefore when stored in data store 161, the secure data 321 and the encrypted metadata 323 are uniquely identified with the unique data identifier 325. In at least one embodiment, the unique data identifier 325 is randomly generated. In another embodiment, the unique data identifier 325 is a globally unique identifier, or GUID. The secure data 321, the encrypted metadata 323 and their associated unique data identifier 325 are collectively called a secure data set 421, in order to simplify the description hereafter.

In at least one embodiment, the data store 161 is a local file system configured to store files and folders in a hierarchical structure. As illustrated in FIG. 4A, the secure data 321 and the encrypted metadata 323 for the example data described earlier are stored under a folder named after the unique data identifier 325 that is a GUID. All four encrypted items 3211 are stored under the folder as files named after the Ids 2213 of the four encrypted items 3211, that is, "1", "2", "3" and "5", respectively. The encrypted metadata 323 is stored under the same folder as a file named "0" to differentiate it from the four encrypted items 3211.

Refer to FIG. 4B, in at least one embodiment, secure data sets 421 are stored in a secure data set container within a data store 161, and there may be more than one secure data set container within the data store 161. For example, if the data store 161 is a local file system a secure data set container may a be folder within the local file system.

In at least one embodiment, the data store 161 is a cloud based storage system, configured to store files and folders in a hierarchical structure. Similar arrangement as described above can be used to store secure data 321 and encrypted metadata 323 along with the associated unique data identifier 325.

After learning how to store the secure data 321, the encrypted metadata 323, and their associated unique data identifier 325 in a file system based data store and a cloud based data store, it becomes obvious for those skilled in the art to understand how to store them in, for example, a relational database, SharePoint, or any other types of storages.

In a preferred embodiment, metadata 223 is digitally signed by using the private key owned by data owner 100, before it is encrypted to generate encrypted metadata 323, so that any unauthorized changes to data 101 are detectable.

The steps of concealing and encrypting processes are described separately above to make it easier to understand. In a preferred embodiment, they are combined to avoid persisting unnecessary intermediate data.

After reading the descriptions above, and understanding how concealing and encrypting processes work it becomes obvious for those skilled in the art to understand how decrypting and revealing processes work.

Distributed Access Control

In at least one embodiment, a data access token is used to ensure that the data, possessed by a data owner, is only accessible to one or more intended recipients selected by the data owner. Refer to FIG. 5A, in at least one embodiment, a recipient 521 comprises a recipient Id 5211, a recipient encryption key 5215, and may also comprise a recipient name 5213. Refer to FIG. 5 and FIG. 6, according to at least one embodiment, the data access token 611 is generated by encrypting a data access object 501 that comprises the data encryption key 301, using one or more recipient encryption keys 5215. In at least one embodiment, the one or more recipient encryption keys 5215 are owned by the one or more recipients 521 respectively, and made accessible to the data owner 100 by the one or more recipients 521 respectively.

Refer to FIG. 5 again, in at least one embodiment, the data access object 501 further comprises one or more access permissions 505 corresponding respectively to the one or more recipient encryption keys 5215. Refer to FIG. 5A, an access permission 505 comprises a permission role 5051 assigned, by the data owner, to the corresponding recipient encryption key 5215. The permission role 5051, in at least one embodiment, comprises a reader role allowing read-only access to data, a writer role allowing read-write access to data, and an owner role allowing read-write access to data as well as changing access permissions of the data. Refer to FIG. 5A again, in at least one embodiment, access permission 505 further comprises the recipient encryption key Id 5053 of the recipient encryption key 5215. In at least one embodiment, access permission 505 further comprises the recipient Id 5211 of the corresponding recipient 521.

In at least one embodiment, the one or more recipient encryption keys 5215 are the public keys of one or more public and private key pairs owned by the one or more recipients 521, respectively. Therefore, the one or more recipients 521 have access to the data encryption key 301 by decrypting, using their private keys, the data access token 611, and extracting the data encryption key 301 from the decrypted data access object 501, thus have access to the data.

In at least one embodiment data owner is selected as a recipient, and the public key of the public and private key pair, owned by the data owner, is used as the recipient encryption key 5215 of the data owner, participating in encrypting the data access object 501; therefore, the data owner can decrypt the data access token 611 and gain access to the encryption key 301.

In a preferred embodiment, encrypting data access object 501 is done by using digital enveloping which is well known in the field. In essence, a session key, that is a symmetric key, is generated and used to encrypt a private message. The session key is itself then encrypted by using the public keys of the recipients. The combination of the encrypted message and the encrypted session key constitutes the digital envelope. Upon receipt, the session key is decrypted by using one of the private keys of the recipients. The encrypted message is then decrypted by using the session key.

In at least one embodiment, if the public key of a recipient 521 is not available or accessible to the data owner a temporary public and private key pair is generated, and made accessible to the recipient. The public key of the temporary public and private key pair is then used as the recipient encryption key 5215 of the recipient 521, participating in encrypting the data access object 501. Therefore, the recipient 521, having access to the temporary public and private key pair, can decrypt the data access token 611 to access the data encryption key 301, and thus gain access to the data. In at least one embodiment, the temporary public and private key pair is locked by a password chosen by the data owner, and shared with the recipient.

Refer to FIG. 5, in at least one embodiment, data access object 501 further comprises a creation time 507 and a valid period 509 of the data access object 501, indicating when the data access object 501 is created and how long it remains valid, used to enforce how long the recipients have access to the data.

In at least one embodiment, data access object 501 is digitally signed the private key of the data owner before being encrypted so that the integrity and authenticity of data access object 501 can be verified.

In at least one embodiment, data access token 611 is associated with the unique data identifier 325 corresponding to the secure data 321 and encrypted metadata 323, and stored in data store 161. In one embodiment data access token 611 is stored as a file named after the unique data identifier 325 in data store 161. In another embodiment data access token 611 is stored in a data access token container within a data store 161 as illustrated in FIG. 6A.

In at least one embodiment, the permission role of an access permission 505 within data access object 501, obtained by decrypting data access token 611 at recipient side, is enforced by a computer program running on a computer of the corresponding recipient.

Refer to FIG. 7, in at least one embodiment, the data store 161 is a server configured to allow a user of the server that is a data owner 100, to store data and share the data with other users that are recipients 521, selected by the data owner, and grant each recipient 521 different levels of access to shared data. The levels of access may include read-only access and read-write access.

A user of the server may have an associated account in the system. The terms "user", "data owner", and "recipient" may reference the account of a user, the account of a data owner, and the account of a recipient, respectively, if that does not cause confusion.

As described earlier, in at least one embodiment, data access token 611 is generated by encrypting data access object 501 that comprises one or more access permissions 505 corresponding respectively to one or more recipients 521 selected by the data owner 100. Refer to FIG. 7, after storing data access token 611, secure data 321, encrypted metadata 323, and the associated unique data identifier 325 in data store 161, in one or more embodiments, data access token 611 stored in the server is shared with the recipients 521 corresponding to the access permissions 505 of the data access object 501, and the recipients 521 are granted read-only access to the data access token 611, so the recipients 521 can only read but not alter the data access token 611 in the server; secure data 321 and encrypted metadata 323 are also shared with the one or more recipients 521, and each of the one or more recipients 521 is granted access to secure data 321 and encrypted metadata 323 based on the assigned permission role 5051 of the access permission 505 of the recipient encryption key 5215 corresponding to the recipient; if the assigned permission role 5051 is a reader role the recipient is granted read-only access, if the assigned permission role 5051 is a writer role the recipient is granted read-write access. Thereby data access token 611, secure data 321 and encrypted metadata 323 are made accessible to the intended recipients 521 by the data owner 100.

In at least one embodiment, according to the description above, permission roles 5051 of access permissions 505 within a data access object 501 are enforced at both data level, by a computer program running on a computer at recipient side, and system level, by setting access permissions to data access token 611, secure data 321 and encrypted metadata 323 in data store 161.

In at least one embodiment, the data store 161 is a server configured to allow a user of the server to store data, share the data with one or more others users, and grant the one or more others users read-only access to data.

Refer to FIG. 8, in at least one embodiment, a recipient encryption key 5215, illustrated in FIG. 6, is the public key of the public and private key pair 523 owned by a recipient 521. To make the public key accessible to data owner 100, recipient 521 uploads the public key to data store 161 and grants data owner 100 read-only access to the public key. Thereby data owner 100 has access to recipient encryption key 5215 that is a public key owned by recipient 521, and data owner can then share data with recipient 521 securely, as described earlier.

In at least one embodiment, recipient 521 may grant more than one user, potential data owners sharing data with the recipient 521, read-only access to recipient encryption key 5215 that is a public key owned by recipient 521. Recipient 521 has complete control of who can access the public key, thus controlling who is/are allowed to share data with recipient 521 securely.

In at least one embodiment, recipient 521 may generate a new public and private key pair, and upload the public key of the new key pair to data store 161 as recipient encryption key 5215. In at least one embodiment, when a new public key is uploaded, the old public key is kept. In at least one embodiment, all old/used public keys are stored in a dedicated container within the data store 161.

Embodiments of the invention also relate to a system for performing the operations herein. The system may be specially constructed for the required purposes, or it may comprise a general-purpose computer selectively activated or reconfigured by a computer program. Such a computer program may be stored in a non-transitory computer readable storage medium, such as, but not limited to, any type of disks including optical disks, random access memories, magnetic or optical cards, flash memories, or any type of media suitable for storing electronic instructions.

FIG. 9 is a schematic block diagram illustrating one embodiment of a computer system 961 configurable for securing user data or data, possessed by a data owner. As illustrated, computer system 961 includes one or more programmable processors, or processors 963 coupled to a memory 965 via bus 967. Computer system 961 further includes network interface 969 coupled to bus 967, and input/output (I/O) controller(s) 971, coupled to devices such as keyboard 981, mouse 983, and display(s) 985. In various embodiments, computer system 961 may be a server, a mainframe computer system, a cloud computing system, a workstation, a network computer, a desktop computer, a laptop, or the like.

Memory 965 may be configured to store instructions and/or data accessible by the one or more processors 963. In various embodiments, system memory 965 may be implemented using any suitable memory technology, such as static random access memory (SRAM), synchronous dynamic RAM (SDRAM), nonvolatile/flash-type memory, or any other type of memory. As illustrated, program instructions and data implementing certain operations, such as, for example, those described above, may be stored within memory 965 as program instructions, or instructions 9651 and data 9653, respectively. In other embodiments, program instructions 9651 and/or data 9653 may be received, sent or stored upon different types of computer-accessible media or on similar media separate from system memory 965 or computer system 961. Generally speaking, a computer-accessible medium may include any tangible, non-transitory storage media or memory media such as electronic, magnetic, or optical media, e.g. disk or CD/DVD-ROM coupled to computer system 961, or non-volatile memory storage (such as "flash" memory).

Network interface 969 may be configured to allow data to be exchanged between computer systems 961 and other devices. In at least one embodiment, network interface 969 may be configured to send instructions to other computer systems or other devices having network interfaces to request other computer systems or other devices to complete certain operations. In various embodiments, network interface 969 may support communication via wired or wireless general data networks.

I/O controller(s) 971 may, in some embodiments, enable connection to one or more display terminals, keyboards, keypads, touch screens, scanning devices, voice or optical recognition devices, or any other devices suitable for entering or retrieving data by one or more computer system 961. Multiple input/output devices may be present in computer system 961 or may be distributed on various nodes of computer system 961. In some embodiments, similar I/O devices may be separate from computer system 961 and may interact with computer system 961 through a wired or wireless connection, such as over network interface 969.

The user interface of a computer system constitutes hardware and software that enables a human to interact with the computer system, giving instructions and receiving outputs. The user interface, in at least one embodiment, may include keyboard 981, mouse 983, display(s) 985 and other I/O devices 987, as well as drivers, operating system and application programs running on the computer system. For example, a data owner may use the user interface to choose intended data recipients, and a data recipient may use the user interface to choose other users, potential data owners sharing data with the recipient, with whom to share public key of the recipient.

Refer to FIG. 9A, in at least one embodiment, the system comprises a client computer 993 and a data store 161 that is a local data storage. The local data storage may be attached to or part of client computer 993, and is configured to store data access token 611, encrypted metadata data 323 and secure data 321 in association with unique data identifier 325. Example local storages may include, but not limited to, hard disks, USB drives, network shares, or any type of local storage.

In some embodiments, the client computer 993 may be implemented using a single instance of computer system 961, while in other embodiments multiple such systems or multiple nodes making up computer system 961, may be configured to host different portions or instances of embodiments.

Refer to FIG. 9B, in at least one embodiment, the system comprises a client computer 993 and a data store 161 that is a server 991, configured to perform the operations described earlier, when requested by client computer 993. Elements of the server 991 may be implemented using at least one instance of computer system 961, configured to host some portions or instances of embodiments. As illustrated in FIG. 9C, in at least one embodiment, the server 991 is a server farm comprising a plurality of computer systems 961 hosting some portions or instances of embodiments.

Refer to FIG. 9B again, in at least one embodiment, the system further comprises a second client computer 995, used by a recipient 521 to receive data from data owner 100 securely. The second client computer 995 may be implemented using a single instance of computer system 961, while in other embodiments multiple such systems or multiple nodes making up computer system 961, may be configured to host different portions or instances of embodiments.

A person of ordinary skill in the art will appreciate that computer system 961 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Further, in some instances, well-known structures and devices are shown in block diagram form, rather than in detail, in order to avoid obscuring the present invention.

The embodiments of the present invention have been described largely by reference to specific examples and in terms of particular allocations of functionality to certain hardware and/or software components. Many other embodiments will be apparent to those skilled in the art upon reading and understanding the above description. Therefore, the scope of the invention should be determined with reference to the appended claims, along with the full scope of equivalents to which such claims are entitled.

The invention claimed is:

1. A method for securing user data, or data, possessed by a data owner, comprising:
   a. devising a concealing mechanism;
   b. concealing, according to said concealing mechanism, and encrypting, using a data encryption key, said data to generate secure data and metadata, such that said data can be reconstructed by using said secure data, said metadata and said data encryption key in accordance with said concealing mechanism;
   c. encrypting said metadata with another encryption key to generate encrypted metadata;
   d. saving said secure data and said encrypted metadata to a data store, and associating a unique data identifier with said secure data and said encrypted metadata in said data store, such that said secure data and said encrypted metadata are uniquely identifiable in said data store;
   e. generating a data access object, wherein said data access object comprises said data encryption key;
   f. obtaining one or more recipient encryption keys;
   g. encrypting said data access object by using said one or more recipient encryption keys to generate a data access token;
   h. saving said data access token to said data store, and associating said data access token with said unique data identifier.

2. The method of claim 1, wherein said another encryption key is the same as said data encryption key.

3. The method of claim 1, wherein said data access object further comprises one or more access permissions corresponding respectively to said one or more recipient encryption keys, wherein each of said one or more access permissions comprises a permission role assigned by said data owner.

4. The method of claim 3, wherein said permission role comprises a reader role and a writer role, wherein said reader role allows read-only access to data, and said writer role allows read-write access to data.

5. The method of claim 3, wherein said data access object further comprises a creation time and a valid period, indicating when said data access object is created and how long said data access object remains valid.

6. The method of claim 3, further comprising: making the public key of a public and private key pair accessible to said data owner by a recipient owning said public and private key pair.

7. The method of claim 6, wherein said obtaining one or more recipient encryption keys, comprising:
   a. selecting one or more recipients;
   b. retrieving the public keys of said one or more recipients and the public key of said data owner as said recipient encryption keys;
   thereby said data access token can only be decrypted by using one of the private keys corresponding to said public keys, respectively.

8. The method of claim 7, wherein each of said access permissions, further comprising: the identifier or Id of the recipient encryption key corresponding to each of said access permissions.

9. The method of claim 8, wherein said data store is configured to allow said data owner to store data, share data with said one or more recipients, and grant said one or more recipients read-only or read-write access to data in said data store, further comprising:
   at sharing side, said data owner
   a. sharing said data access token with said one or more recipients, and granting said one or more recipients read-only access to said data access token, such that said one or more recipients can only read but not alter said data access token stored in said data store; and
   b. sharing said secure data and said encrypted metadata with said one or more recipients, and granting each of said one or more recipients, read-only access if the permission role of the access permission corresponding to the recipient encryption key of the recipient is reader, or read-write access if the permission role of the access permission corresponding to the recipient encryption key of the recipient is writer, such that said one or more recipients have proper accesses to said secure data and said encrypted metadata stored in said data store;
   at receiving side, a recipient
   a. retrieving said data access token from said data store, and decrypting said data access token by using the private key corresponding to the public key of said recipient to obtain said data access object;
   b. retrieving said encrypted metadata from said data store, and decrypting said encrypted metadata by using said data encryption key obtained from said data access object;
   c. retrieving said secure data from said data store, and reconstructing said data by using said secure data retrieved from said data store, the decrypted metadata and the data encryption key obtained from said data access object in accordance with said concealing mechanism;
   thereby said recipient receives said data in a secure manner.

10. The method of claim 9, at receiving side, further comprising:
    a. retrieving the permission role corresponding to said recipient from the decrypted data access object;
    thereby a computer program, running on a client computer of said recipient, can enforce said permission role granted to said recipient.

11. The method of claim 9, wherein making the public key of a public and private key pair accessible to said data owner by a recipient owning said public and private key pair, comprising:
    a. uploading, by said recipient, said public key to said data store;
    b. sharing said public key in said data store, by said recipient, with said data owner;
    c. granting said data owner, by said recipient, read-only access to said public key in said data store;
    thereby said public key owned by said recipient is accessible to said data owner.

12. The method of claim 11, wherein said retrieving the public keys of said one or more recipients, if the public key of a recipient is not available to said data owner, comprising:
    a. generating a temporary public and private key pair;
    b. using the public key of said temporary public and private key pair as said recipient encryption key of said recipient;
    c. making said temporary public and private key pair accessible to said recipient;
    thereby said recipient can decrypt, by using the private key of said temporary public and private key pair, said data access token to gain access to said data encryption key, thus gain access to data.

13. The method of claim 12, wherein making said temporary public and private key pair accessible to said recipient, comprising:
   a. uploading said temporary public and private key pair to said data store;
   b. sharing said temporary public and private key pair with said recipient.

14. A system for securing user data or data, possessed by a data owner, comprising: a data store configured to allow said data owner to store data; a client computer having at least one processor, a network interface, and a machine-readable medium storing instructions that, when executed by said at least one processor, cause said at least one processor to perform operations, on behalf of said data owner, comprising:
   a. generating a data encryption key;
   b. concealing, according to a concealing mechanism, and encrypting, using said data encryption key, said data to generate secure data and metadata, such that said data can be reconstructed by using said secure data, said metadata and said data encryption key in accordance with said concealing mechanism;
   c. encrypting said metadata with said data encryption key to generate encrypted metadata;
   d. generating a unique data identifier;
   e. saving said secure data and said encrypted metadata to said data store, and associating said unique data identifier with said secure data and said encrypted metadata in said data store, such that said secure data and said encrypted metadata are uniquely identifiable in said data store;
   wherein said client computer further comprising a user interface, and said machine-readable medium storing additional instructions that, when executed by said at least one processor, cause said at least one processor to perform operations, on behalf of said data owner, comprising:
   a. selecting, by said data owner using said user interface, one or more recipients, each having a public and private key pair and having made the public key of said key pair accessible to said data owner;
   b. retrieving the public keys of said one or more recipients, respectively, and the public key of said data owner, as recipient encryption keys;
   c. generating a data access object, comprising said data encryption key, and one or more access permissions corresponding respectively to said one or more recipients, wherein each of said one or more access permissions comprises a permission role assigned by said data owner using said user interface, wherein said permission role comprises a reader role and a writer role, wherein said reader role allows read-only access to data, and said writer role allows read-write access to data;
   d. encrypting said data access object by using said recipient encryption keys to generate a data access token;
   e. saving said data access token to said data store, and associating said data access token with said unique data identifier.

15. The system of claim 14, wherein said data store is a server, configured to allow said data owner to store data, share data with said one or more recipients and grant said one or more recipients read-only or read-write access to data in said data store, having:
   a. at least one processor;
   b. a network interface configured to receive requests from said network interface on said client computer; and
   c. a machine-readable medium storing instructions that, when requested by said client computer, are executed by said at least one processor on said server, and cause said at least one processor on said server to perform the operations requested by said client computer.

16. The system of claim 15, wherein said machine-readable medium on said client computer storing additional instructions that, when executed by said at least one processor on said client computer, cause said at least one processor on said client computer to perform operations, including sending requests to said server when necessary, on behalf of said data owner, comprising:
   a. sharing said data access token with said one or more recipients, and granting said one or more recipients read-only access to said data access token, such that said one or more recipients can only read but not alter said data access token stored in said data store; and
   b. sharing said secure data and said encrypted metadata with said one or more recipients, and granting each of said one or more recipients, read-only access if the permission role of the access permission corresponding to the recipient encryption key of the recipient is reader, or read-write access if the permission role of the access permission corresponding to the recipient encryption key of the recipient is writer, such that said one or more recipients have proper accesses to said secure data and said encrypted metadata stored in said data store.

17. The system of claim 16, further comprising: a second client computer having at least one processor; a network interface; and a machine-readable medium storing instructions that, when executed by said at least one processor on said second client computer, cause said at least one processor on said second client computer to perform operations, including sending requests to said server when necessary, on behalf of a recipient, comprising:
   a. retrieving said data access token from said data store, and decrypting said data access token by using the private key corresponding to the public key of said recipient to obtain said data access object;
   b. retrieving said encrypted metadata from said data store, and decrypting said encrypted metadata by using said data encryption key obtained from said data access object;
   c. retrieving said secure data from said data store, and reconstructing said data by using said secure data retrieved from said data store, the decrypted metadata and the data encryption key obtained from said data access object in accordance with said concealing mechanism.

* * * * *